(12) United States Patent
Sun

(10) Patent No.: US 11,841,991 B2
(45) Date of Patent: Dec. 12, 2023

(54) METHOD FOR GESTURE CONTROL AND RELATED DEVICES

(71) Applicant: GUANGDONG OPPO MOBILE TELECOMMUNICATIONS CORP., LTD., Guangdong (CN)

(72) Inventor: Zhe Sun, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 18/146,574

(22) Filed: Dec. 27, 2022

(65) Prior Publication Data

US 2023/0135048 A1 May 4, 2023

Related U.S. Application Data

(63) Continuation of application No. PCT/CN2020/106434, filed on Jul. 31, 2020.

(51) Int. Cl.
*G06V 40/20* (2022.01)
*G06F 3/01* (2006.01)

(52) U.S. Cl.
CPC .............. *G06F 3/017* (2013.01); *G06V 40/28* (2022.01)

(58) Field of Classification Search
None
See application file for complete search history.

(56) References Cited

U.S. PATENT DOCUMENTS

| | | | | |
|---|---|---|---|---|
| 8,615,108 B1* | 12/2013 | Stoppa | ................. | G06V 10/462 382/199 |
| 9,646,201 B1* | 5/2017 | Horowitz | ................ | G06T 7/251 |
| 10,310,675 B2* | 6/2019 | Oshima | .................... | G06F 3/017 |
| 10,481,700 B1* | 11/2019 | Gummadi | .............. | G06V 10/75 |

(Continued)

FOREIGN PATENT DOCUMENTS

| CN | 103677417 | 3/2014 |
|---|---|---|
| CN | 103970260 | 8/2014 |

(Continued)

OTHER PUBLICATIONS

WIPO, International Search Report and Written Opinion for International Application No. PCT/CN2020/106434, dated Apr. 25, 2021.

(Continued)

*Primary Examiner* — Rinna Yi
(74) *Attorney, Agent, or Firm* — Hodgson Russ LLP

(57) ABSTRACT

A method for gesture control and related devices are provided. Whether a first indication field is in an initialization state is determined. If the first indication field is in the initialization state, the first indication field is set according to a collected control action. If the first indication field is not in the initialization state, a second indication field is set according to a collected gesture action B1. When the gesture action B1 and the control action meet an association relationship, a target operation instruction is determined according to the first indication field and the second indication field, the target operation instruction is executed, the second indication field is reset, and the method for gesture control is repeatedly executed.

15 Claims, 12 Drawing Sheets

(56) References Cited

U.S. PATENT DOCUMENTS

| | | | | |
|---|---|---|---|---|
| 2009/0263021 | A1* | 10/2009 | Takamori | G06V 20/52 |
| | | | | 382/181 |
| 2011/0001813 | A1* | 1/2011 | Kim | G06V 40/28 |
| | | | | 382/153 |
| 2011/0221666 | A1 | 9/2011 | Newton et al. | |
| 2012/0243738 | A1* | 9/2012 | Sakata | G06V 40/176 |
| | | | | 382/103 |
| 2013/0088422 | A1* | 4/2013 | Niikura | G06F 3/0304 |
| | | | | 345/156 |
| 2013/0328766 | A1 | 12/2013 | Igarashi et al. | |
| 2013/0330006 | A1* | 12/2013 | Kuboyama | G06F 3/0487 |
| | | | | 382/190 |
| 2014/0062861 | A1* | 3/2014 | Yamashita | G06F 3/011 |
| | | | | 382/103 |
| 2016/0349848 | A1 | 12/2016 | Han | |
| 2017/0289453 | A1* | 10/2017 | Makita | H04N 23/6812 |
| 2017/0336963 | A1 | 11/2017 | Lee et al. | |
| 2018/0211104 | A1* | 7/2018 | Zhao | G06F 18/22 |
| 2019/0302895 | A1 | 10/2019 | Jiang et al. | |

FOREIGN PATENT DOCUMENTS

| | | |
|---|---|---|
| CN | 104040464 | 9/2014 |
| CN | 104914998 | 9/2015 |
| CN | 105278763 | 1/2016 |
| CN | 105867720 | 8/2016 |
| CN | 108196678 | 6/2018 |
| CN | 109190559 | 1/2019 |
| CN | 109324746 | 2/2019 |
| CN | 106203380 | 11/2019 |
| CN | 110716648 | 1/2020 |
| CN | 110837792 | 2/2020 |
| CN | 111352499 | 6/2020 |
| EP | 2924539 A1 | 9/2015 |
| EP | 3528093 | 8/2019 |
| WO | 2013095677 | 6/2013 |

OTHER PUBLICATIONS

CNIPA, First Office Action for CN Application No. 202010761968.1, dated Jan. 29, 2022.

CNIPA, Notification to Grant Patent Right for Invention for CN Application No. 202010761968.1, dated Aug. 31, 2022.

EPO, Partial Supplementary European Search Report for EP Application No. 20947091.3, dated Jun. 29, 2023.

EPO, Extended European Search Report for EP Application No. 20947091.3, dated Oct. 11, 2023.

\* cited by examiner

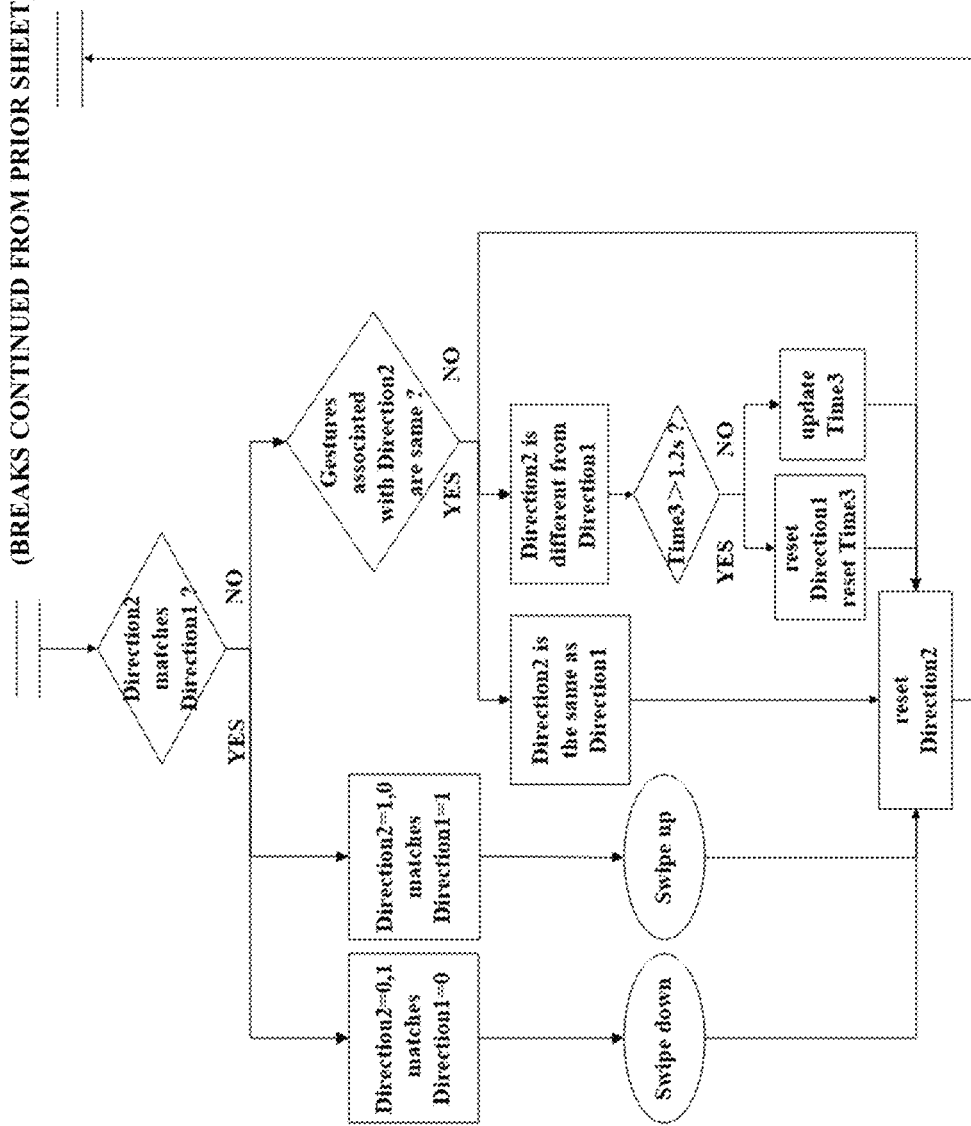

METHOD FOR GESTURE CONTROL AND RELATED DEVICES

CROSS-REFERENCE TO RELATED APPLICATION(S)

This application is a continuation of International Application No. PCT/CN2020/106434, filed Jul. 31, 2020, the entire disclosure of which is incorporated herein by reference.

TECHNICAL FIELD

This application relates to the field of gesture recognition technologies, and particularly to a method for gesture control and related devices.

BACKGROUND

At present, for air gesture control technologies supported by devices such as mobile phones, the mobile phone generally executes a target operation by detecting an air gesture action of a user. If the target operation needs to be executed continuously, the air gesture action needs to be repeatedly executed by the user, and the mobile phone will repeatedly detect the air gesture and execute the target operation. If an air gesture action is relatively complex, such mechanism will make the continuous control process be time-consuming and have an obvious sense of stuttering, which affects the user experience and thus is difficult to meet usage requirements.

SUMMARY

In a first aspect, implementations of the disclosure provide a method for gesture control. The method for gesture control includes the following. Whether a first indication field is in an initialization state is determined. On condition that the first indication field is in the initialization state, the first indication field is set according to a control action collected. On condition that the first indication field is not in the initialization state, a second indication field is set according to a gesture action B1 collected. When the gesture action B1 and the control action meet an association relationship, a target operation instruction is determined according to the first indication field and the second indication field, the target operation instruction is executed, the second indication field is reset, and return to determining whether the first indication field is in the initialization state.

In a second aspect, implementations of the disclosure provide a method for gesture control. The method for gesture control includes the following. Contents of a first page are displayed on a current interface of a screen of a local device. Whether a gesture action A1 of a user is detected is determined. On condition that no gesture action A1 is detected, detect the gesture action A1. On condition that the gesture action A1 is detected, display gesture information and/or instruction information associated with the gesture action A1, detect a gesture action B1 of the user, execute a preset operation on the contents of the first page according to the gesture action A1 and the gesture action B1, reset the gesture action B1, and return to determining whether the gesture action A1 of the user is detected, where the gesture information is visualization information of hand movement of the gesture action A1, and the instruction information is visualization information of a reference operation instruction associated with the gesture action A1.

In a third aspect, implementations of the disclosure provide a terminal. The terminal includes a processor and a memory. The memory is coupled with the processor and stores one or more programs which, when executed by the processor, are operable with the processor to: determine whether a first indication field is in an initialization state; set the first indication field according to a control action collected, on condition that the first indication field is in the initialization state; set a second indication field according to a gesture action B1 collected, on condition that the first indication field is not in the initialization state; and determine a target operation instruction according to the first indication field and the second indication field, execute the target operation instruction, reset the second indication field, and return to determining whether the first indication field is in the initialization state, when the gesture action B1 and the control action meet an association relationship.

In a fourth aspect, implementations of the disclosure provide a terminal. The terminal includes a processor and a memory. The memory is coupled with the processor and stores one or more programs which, when executed by the processor, are operable with the processor to execute all or part of the operations of the method described in the second aspect of the disclosure.

BRIEF DESCRIPTION OF THE DRAWINGS

The following will give a brief description of accompanying drawings used for describing implementations or the related art.

DETAILED DESCRIPTION

Figure 1A:
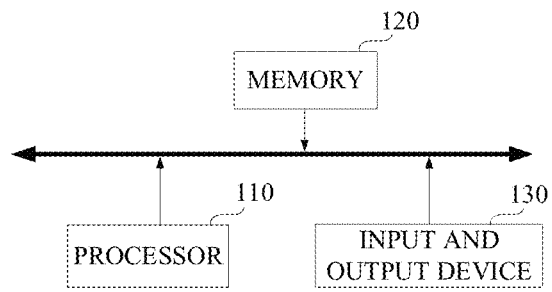
FIG. 1A is a schematic structural diagram illustrating a terminal provided in implementations of the disclosure.

In order for those skilled in the art to better understand technical solutions of the disclosure, technical solutions of implementations of the disclosure will be depicted clearly and completely with reference to accompanying drawings in the implementations. Apparently, implementations described below are merely some implementations, rather than all implementations of the disclosure. All other implementations obtained by those of ordinary skill in the art based on the implementations without creative efforts shall fall within the protection scope of the disclosure.

The terms "first", "second", and the like used in the specification, the claims, and the accompany drawings of the disclosure are used to distinguish different objects rather than describe a particular order. In addition, the terms "include", "comprise", and "have" as well as variations thereof are intended to cover non-exclusive inclusion. For example, a process, method, system, product, or device including a series of steps/operations or units is not limited to the listed steps/operations or units, on the contrary, it can optionally include other steps/operations or units that are not listed; alternatively, other steps/operations or units inherent to the process, method, product, or device can be included either.

The term "implementation" referred to herein means that particular features, structures, or properties described in conjunction with the implementations may be defined in at least one implementation of the disclosure. The phrase "implementation" appearing in various places in the specification does not necessarily refer to the same implementation or an independent/alternative implementation that is mutually exclusive with other implementations. Those skilled in the art will understand expressly and implicitly that an implementation described herein may be combined with other implementations.

In order to better understand solutions of implementations of the disclosure, related terms and concepts involved in implementations of the disclosure are first introduced below.

Gesture Recognition

The gesture recognition is a topic of recognizing human gestures through mathematical algorithms. Gestures may refer to a motion of various parts of a person's body, but commonly refer to a face motion or a hand motion. Users can use simple gestures to control or interact with a device, allowing a computer to understand human behavior. Its core technologies are gesture segmentation, gesture analysis, and gesture recognition.

State Machine

The state machine is short for finite-state auto machine (FSM), which is a mathematical model of an abstraction of running rules of real matters. The state machine is composed of a state register and a combinational logic circuit, and can perform state transfer according to a preset state based on a control signal. The state machine is a control center that coordinates relevant signal actions and completes specific operations.

Image Front-End (IFE)

The IFE is Mipi RAW image data unit in an image signal processor (ISP).

Lightweight Image Front-End (IFE_lite)

The IFE_lite is a lightweight IFE interface in the ISP.

Referring to FIG. 1A, FIG. 1A is a block diagram illustrating a terminal 10 provided in exemplary implementations of the disclosure. The terminal 10 may be an electronic device with communication capabilities. The electronic device may include various handheld devices with wireless communication capabilities, on-board devices, wearable devices, computing devices, or other processing devices connected to a wireless modem, as well as various forms of user equipment (UE), mobile stations (MS), terminal devices, etc. The terminal 10 of the disclosure may include one or more of a processor 110, a memory 120, and an input and output device 130.

The processor 110 may include one or more processing cores. The processor 110 connects various parts of the entire terminal 10 through various interfaces and lines, and is configured to execute various functions of the terminal 10 and process data by running or executing instructions, programs, code sets or instruction sets stored in the memory 120 and invoking data stored in the memory 120. The processor 110 may include one or more processing units. For example, the processor 110 includes a central processing unit (CPU), an application processor (AP), a modem processor, a graphics processing unit (GPU), an image signal processor (ISP), a controller, a video codec, a digital signal processor (DSP), a baseband processor, and/or a neural-network processing unit (NPU), and the like. The controller may be a nerve center and a command center of the terminal 10. The controller is configured to generate an operation control signal according to an instruction operation code and a timing signal, and complete control of fetching an instruction and executing an instruction. The CPU is mainly configured to handle an operating system, a user interface, and an application. The GPU is responsible for rendering and drawing display contents. The modem is configured to handle wireless communication. The DSP is configured to process a digital signal, including a digital image signal and other digital signals. The NPU is a neural-network (NN) computing processor. The NPU can process input information quickly by drawing on a structure of biological neural networks (e.g., a transfer mode between neurons in a human brain), and can continuously learn by itself. Applications of the terminal 10 such as intelligent cognition can be implemented through the NPU, such as image recognition, face recognition, speech recognition, text understanding, etc. The processor 110 may be provided with a memory for storing instructions and data. In some implementations, the memory of the processor 110 is a cache memory, and the memory may hold instructions or data that have just been used or recycled by the processor 110. If the processor 110 needs to use the instruction or data again, the instruction or data can be invoked directly from the memory to avoid repeated access, which can reduce a waiting time of the processor 110, thereby improving system efficiency.

It can be understood that, the processor 110 may be mapped as a system on a chip (SOC) in an actual product. The processing unit and/or the interface may not be integrated with the processor 110, and a single communication chip or an electronic component may be used to achieve corresponding functions. An interface connection relationship between the above modules/unit is merely a schematic illustration, which does not constitute any limitation on a structure of the terminal 10.

The memory 120 may include a random access memory (RAM), or may include a read-only memory (ROM). In some implementations, the memory 120 includes a non-transitory computer-readable storage medium. The memory 120 may be used to store instructions, programs, code sets or instruction sets. The memory 120 may include a storage program region and a storage data region. The storage program region may store instructions for implementing an operating system, instructions for implementing at least one function (e.g., a touch function, a sound playback function, an image playback function, etc.), instructions for implementing the following method implementations, etc., where the operating system may be an Android system (including a deep development system based on the Android system), an IOS system developed by Apple (including a deep development system based on the IOS system), or other systems. The storage data region may also store data created by the terminal 10 when using (e.g., a phone book, audio and video data, chat record data), and other data.

A software system of the terminal 10 may adopt a layered architecture, an event-driven architecture, a microkernel architecture, a microservice architecture, or a cloud architecture. In implementations of the disclosure, software architecture of the terminal 10 is exemplarily illustrated by taking an Android system and an IOS system with a layered architecture as an example.

Figure 1B:
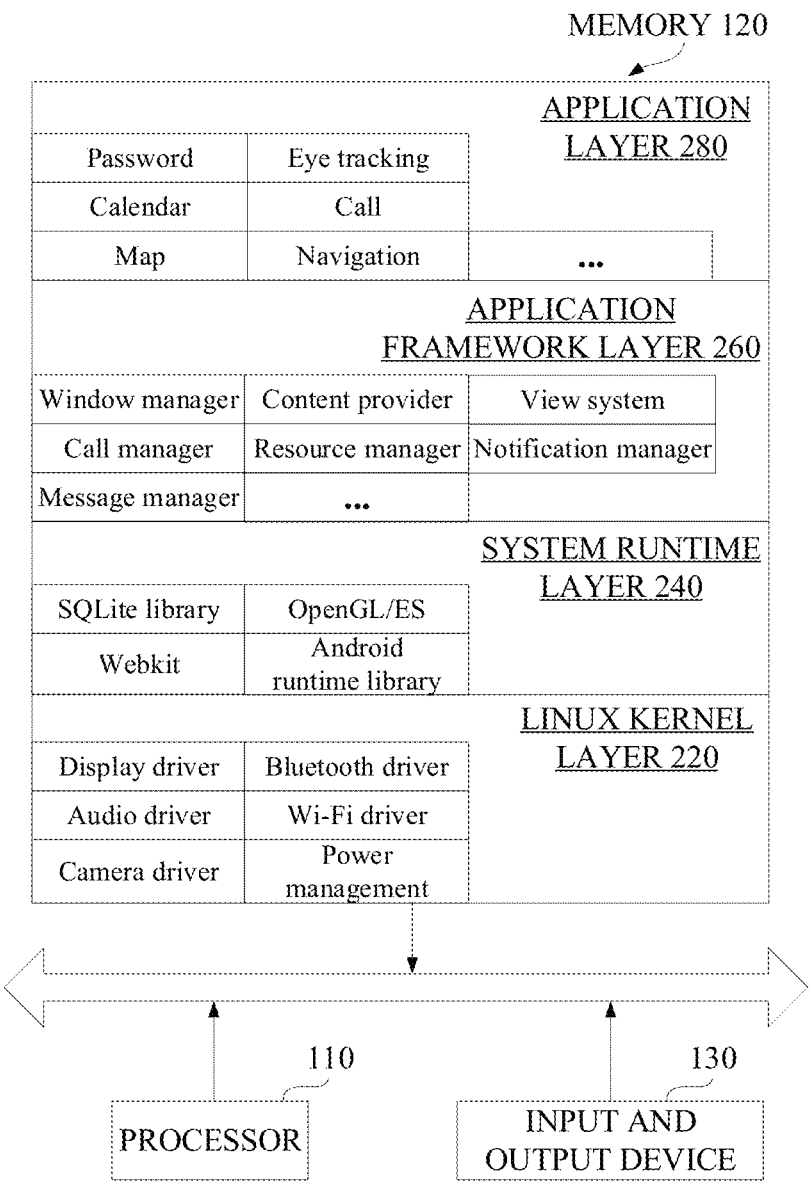
FIG. 1B is an architectural schematic diagram illustrating a software and hardware system configured with an Android system provided in implementations of the disclosure.

FIG. 1B is an architectural schematic diagram illustrating a software and hardware system configured with an Android system. The memory 120 may store a Linux kernel layer 220, a system runtime layer 240, an application framework layer 260, and an application layer 280. Layers communicate with each other through a software interface. The Linux kernel layer 220, the system runtime layer 240, and the application framework layer 260 belong to an operating system space.

The application layer 280 belongs to a user space. At least one application runs in the application layer 280. The application may be a native application that native to the operating system, or may be a third-party application developed by a third-party developer, including password, eye tracking, camera, gallery, calendar, call, map, navigation, WLAN, Bluetooth, music, video, SMS, and other applications.

The application framework layer 260 provides various APIs that may be used when building an application of the application layer. Developers can also build their own applications by using these APIs, such as a window manager, a content provider, a view system, a call manager, a resource manager, a notification manager, a message manager, an activity manager, a package manager, a location manager. The window manager is used to manage a window program.

The system runtime layer 240 provides main feature support for the Android system through some C/C++ libraries. For example, an SQLite library provides database support, an OpenGL/ES library provides 3D drawing support, and a Webkit library provides browser kernel support. The system runtime layer 240 also provides an Android runtime library, which mainly provides some core libraries to allow developers to use a Java language to write Android applications.

The Linux kernel layer 220 provides various hardware of the terminal 10 with underlying drivers, such as a display driver, an audio driver, a camera driver, a Bluetooth driver, a Wi-Fi driver, power management, and the like.

It should be understood that, the method for interface display of implementations of the disclosure can be applied not only to the Android system, but also to other operating systems, such as an IOS system.

A common terminal form at present is depicted in detail below with reference to FIG. 1C. It can be understood that, a structure illustrated in implementations of the disclosure do not constitute any limitation on the terminal 10. In other implementations of the disclosure, the terminal 10 may include more or less components than illustrated, or may combine some components or separate some components, or may have different component arrangements. The illustrated components may be implemented in hardware, software, or a combination of software and hardware.

Figure 1C:
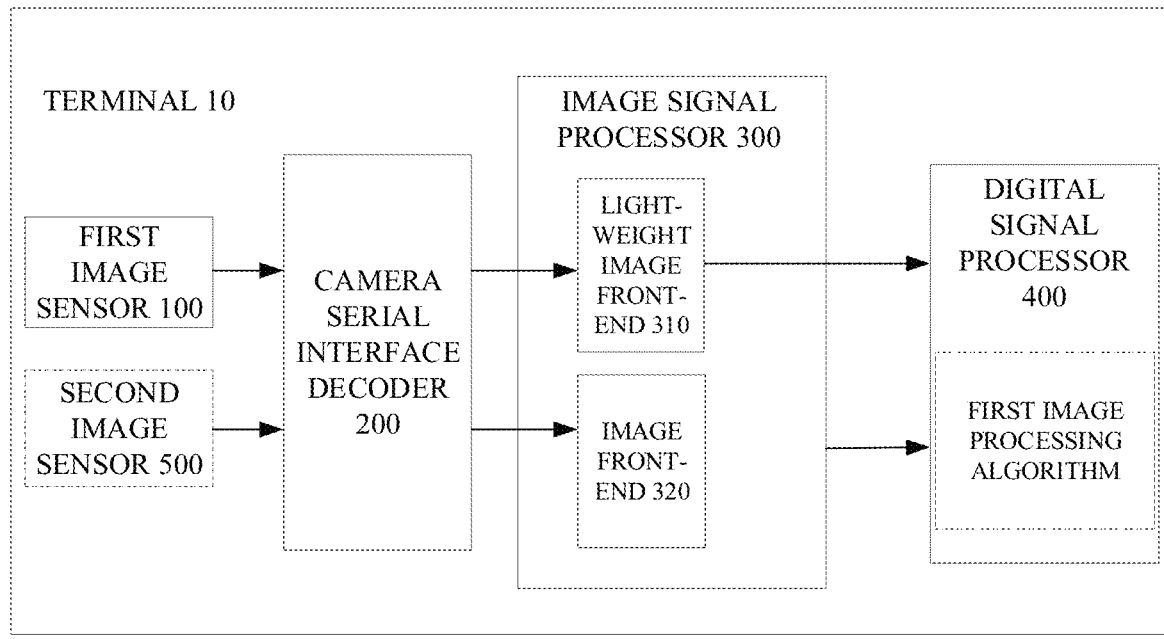
FIG. 1C is a schematic structural diagram illustrating a terminal provided in other implementations of the disclosure.

As illustrated in FIG. 1C, the terminal 10 includes a first image sensor 100, a camera serial interface decoder 200, an image signal processor 300, and a digital signal processor 400. The image signal processor 300 includes a light-weight image front-end 310 and an image front-end 320. The first image sensor 100 is coupled with the camera serial interface decoder 200, the camera serial interface decoder 200 is coupled with the light-weight image front-end 310 of the image signal processor 300, and the light-weight image front-end 310 is coupled with the digital signal processor 400.

The digital signal processor 400 is configured to receive first raw image data collected by the first image sensor 100 via the camera serial interface decoder 200 and the light-weight image front-end 310, and invoke a first image processing algorithm to perform first preset processing on the first raw image data to obtain first reference image data. The image front-end 320 is configured to transmit second raw image data collected by a second image sensor 500 of the terminal 10 or the first raw image data collected by the first image sensor 100.

The first raw image data and the second raw image data each may be MIPI RAW image data, and the first reference image data may be YUV image data. The first image sensor 100 may be a low power consumption camera.

The first image processing algorithm is used to realize a data processing effect equivalent to an image signal processor by means of a software algorithm, that is, an operation corresponding to a first preset processing. The first preset processing includes at least one of automatic exposure control, lens attenuation compensation, brightness enhancement, black-level correction, lens-shading correction, dead-pixel correction, color interpolation, auto white balance, or color correction. It should be noted that, although the first image sensor 100 transmits the first raw image data through the light-weight image front-end 310 of the image signal processor 300, the image signal processor 300 does not further process the first raw image data. The image signal processor 300 performs the same processing as or different processing from the first preset processing only on the second raw image data or the first raw image data transmitted via the image front-end 320 by means of a hardware module of a local device. Moreover, since the light-weight image front-end 310 is only responsible for interface input and does not do other operations, power consumption of the light-weight image front-end 310 is relatively lower compared to a prior-art solution of enabling the image front-end 320 to transmit image data (in this case, other modules of the image signal processor 300 need to be enabled to process image data).

The first image sensor 100 may be a low power consumption image sensor, and the second image sensor may be an image sensor in a front-facing camera. Context awarenessbased application functions that can be realized by the first image sensor 100 of the terminal include at least one of the following.

1. Privacy protection: in a scenario where a message containing privacy information that is not expected to be seen by others is received, such as a social application receives a new message from a girlfriend, and a test message of incoming wage deposit is received from the bank, the terminal may control its screen to be turned off if the first image sensor 100 detects that stranger's eyes fix a screen of a host's mobile phone.

2. Air operation: in a scenario where a user is cooking and is holding a mobile phone aside to view a recipe, and there is an important incoming call, if the hand of the user is dirty and is not convenient to directly operate the mobile phone, the terminal may execute an operation corresponding to a user's air gesture by detecting the air gesture with the first image sensor 100.

3. Gazing on a screen without screen-off: in a scenario where a user does not want to turn off a screen, for example, when reading a recipe or an e-book, there is usually a page that needs to read repeatedly, and soon it's time to automatically turn off the screen, the terminal will not enable an automatic screen-off function if the first image sensor 100 detects that the user is still gazing on the screen when the automatic screen-off time arrives.

4. A screen orientation function is disabled when a user lies down: in a scenario where a screen orientation of an electronic device changes because of the user lying down, for example, the screen orientation changes from a vertical orientation to a horizontal orientation, the terminal disables the screen orientation function if the first image sensor 100 detects that a gaze direction of user's eyes follows change of the screen orientation.

At present, for gesture control technologies supported by devices such as mobile phones, an illegal gesture such as a return gesture may occur in human hand control. In order to avoid responding to the user's illegal gesture, an existing solution is generally to stop recognition for a time period after an action is executed, to allow the user to recover to a correct gesture. However, the pause time period will affect a user experience, and causes that a quick and continuous response cannot be achieved in gesture control.

In view of the above problems, implementations of the disclosure provide a method for gesture control. Hereinafter, implementations of the disclosure will be depicted in detail with reference to accompanying drawings.

Figure 2A:
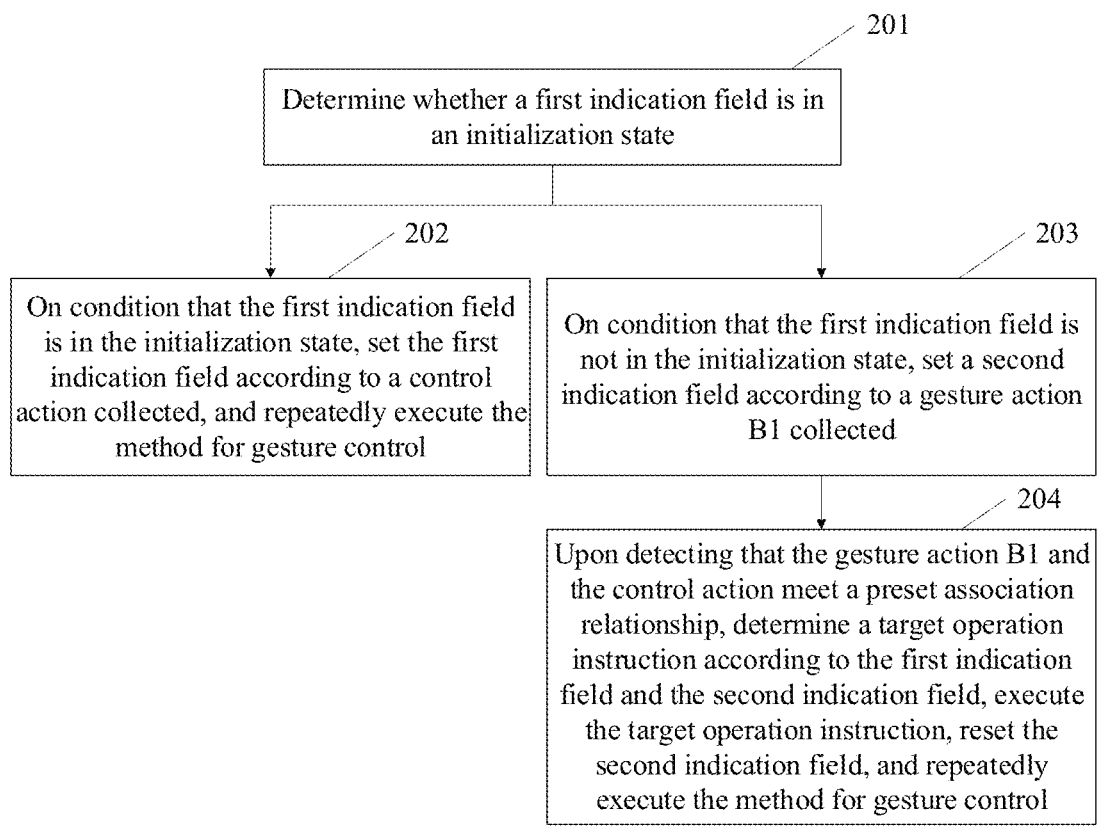
FIG. 2A is a schematic flowchart illustrating a method for gesture control provided in implementations of the disclosure.

Referring to FIG. 2A, FIG. 2A is a schematic flowchart illustrating a method for gesture control provided in implementations of the disclosure. As illustrated in FIG. 2A, the method includes the following.

At 201, determine whether a first indication field is in an initialization state.

The first indication field is associated with a user's control action.

Before 201, the terminal may set a sampling mode corresponding to a gesture control function of the terminal to a first frame-rate mode or set a display resolution of the terminal to a first resolution mode, and set the first indication field to the initialization state. That is, perform initialization for a gesture control algorithm. Once the initialization is performed, the first indication field is configured with an initial parameter (e.g., −1) by default.

At 202, if the first indication field is in the initialization state, the first indication field is set according to a collected control action, and return to determining whether the first indication field is in the initialization state.

The control action may be collected before 201, or may be collected at 202, which is not limited herein.

At 203, if the first indication field is not in the initialization state, a second indication field is set according to a collected gesture action B1.

The second indication field is associated with a user's gesture action B1. The gesture action B1 is represented by at least two gesture detection results. The action timing of the control action is prior to the action timing of the gesture action B1. The gesture action B1 is an air gesture. The air gesture refers to a non-contact (or contactless) gesture control operation. The gesture detection result refers to a user's gesture determined according to a gesture image. The gesture image refers to an image that captures movement, action, or pose of a subject (e.g., a hand). In other words, a valid gesture, an invalid gesture, or no gesture may exist in a collected gesture image due to different shooting scenarios.

The "contactless" means that a human hand does not contact a screen of a terminal.

The gesture image may be collected before 201, or may be collected at 202, which is not limited herein.

In specific implementations, a recognition algorithm for determining a user's gesture detection result according to the gesture image may be various, and may include gesture direction-based feature detection, gesture template-based comparison, key-feature-point detection, which is not limited herein.

The at least two gesture detection results may be same gesture detection results, or may be different gesture detection results, which are not limited herein.

At 204, upon detecting that the gesture action B1 and the control action meet a preset association relationship, a target operation instruction is determined according to the first indication field and the second indication field, the target operation instruction is executed, the second indication field is reset, and return to determining whether the first indication field is in the initialization state.

A target object to-be-reset includes the first indication field and the second indication field, and at 204, the second indication field is reset while the first indication field is not reset.

In one possible example, detecting that the gesture action B1 and the control action meet the preset association relationship (at 204) includes: detecting that the second indication field and the first indication field meet the preset association relationship.

The preset association relationship may be defined by a user, defined by a developer before a terminal leaves a factory, or set according to an association relationship pushed by the cloud, which is not limited herein.

As illustrated in Table 1, in the association relationship between the gesture action B1 and the control action, an action type of the control action and an action type of the gesture action B1 are not limited herein.

TABLE 1

| Control action | Gesture action B1 | Relationship description |
|---|---|---|
| Gesture action of "palm" | The palm is flipped to the back of the hand | Meet preset association relationship |
| Gesture action of "back of hand" | The back of the hand is flipped to the palm | Meet preset association relationship |
| Voice action of "swipe down" | The palm is flipped to the back of the hand | Meet preset association relationship |
| Gesture action of "OK" | The back of the hand is turned to a clenched fist | Meet preset association relationship |

The target operation instruction may be various, which is not limited herein.

Figure 2B:
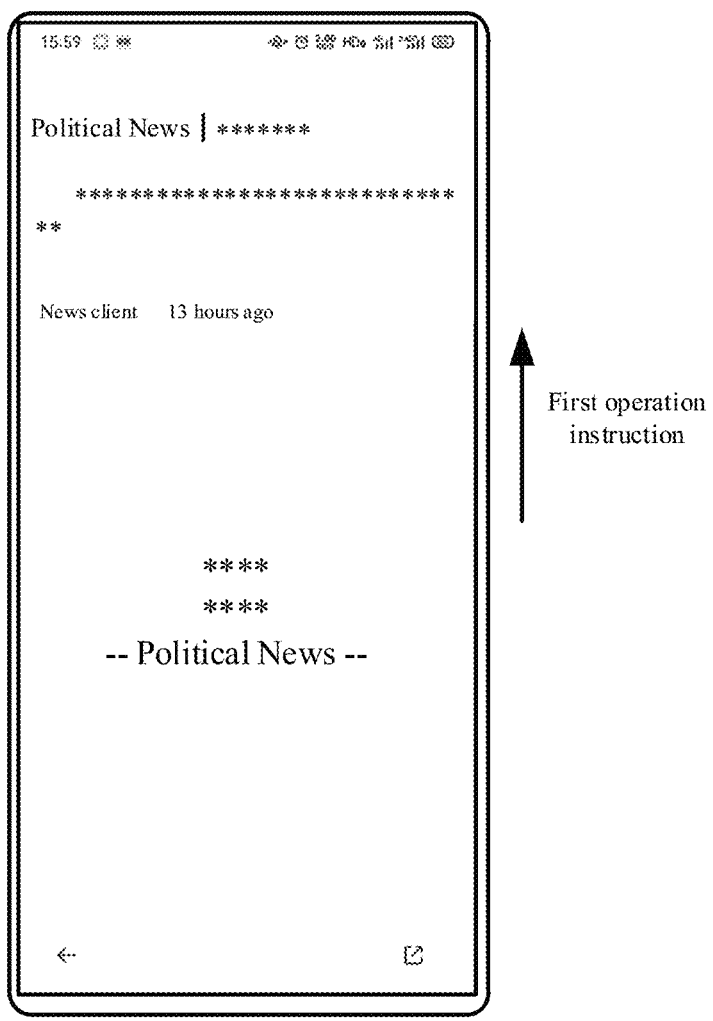
FIG. 2B is a schematic diagram illustrating an application scenario of a swipe-up operation provided in implementations of the disclosure.
Figure 2C:
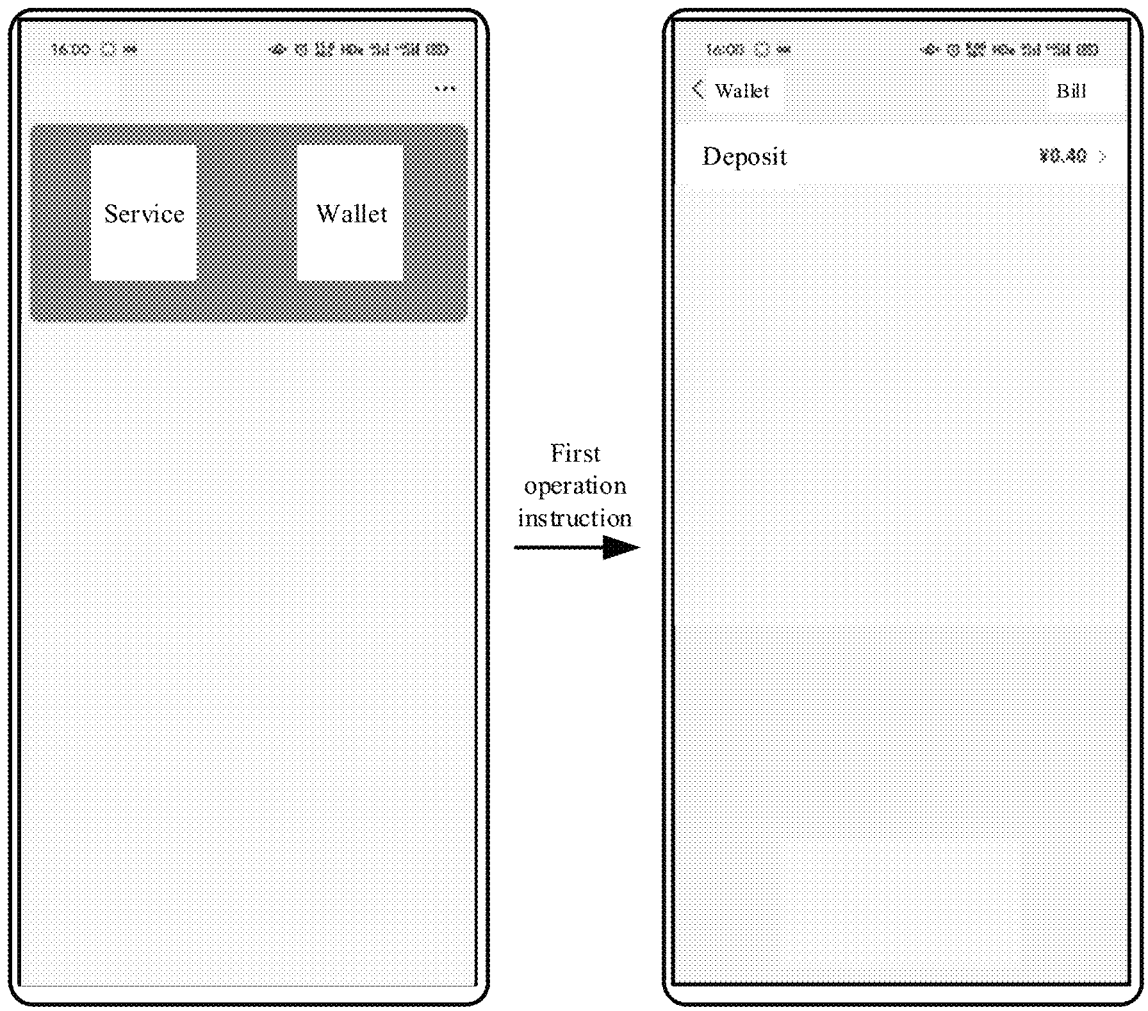
FIG. 2C is a schematic diagram illustrating an application scenario of a wallet opening function provided in implementations of the disclosure.

As an example, the target operation instruction may be a system-level function instruction or an application-level function instruction. The system-level function instruction refers to an operation instruction of a basic function supported by a system. As illustrated in FIG. 2B, the target operation instruction is a swipe-up instruction. The application-level function instruction refers to an operation instruction of a dedicated function in an application. As illustrated in FIG. 2C, the target operation instruction is an operation instruction in an application, for opening a wallet.

In one possible example, the control action includes at least one of a voice action or a gesture action.

As an example, a first preparatory action of "swipe down" is entered through voice control, or entered through a gesture action of the palm. The first preparatory action is combined with a second preparatory action (i.e., the gesture action B1) to form control of the target operation instruction.

In one specific implementation, a control-action combination set is predefined, to store legal control-action combinations in advance.

As an example, the first indication field is set to 0 through voice (i.e., direction1=0), where "direction1=0" is used to determine a swipe-down operation. As another example, the first indication field is set to 1 through voice (i.e., direction1=1), where "direction1=1" is used to determine a swipe-up operation.

As can be seen, in the example, the control action can be the voice action and the gesture action, which can expand an application scope and improve application comprehensiveness.

In one possible example, the control action is a gesture action, and the first indication field is associated with a user's gesture action A1.

The gesture action A1 may be a hand action of the same gesture whose duration is longer than a preset duration.

The gesture action may be various, which is not limited herein.

Figure 2D:
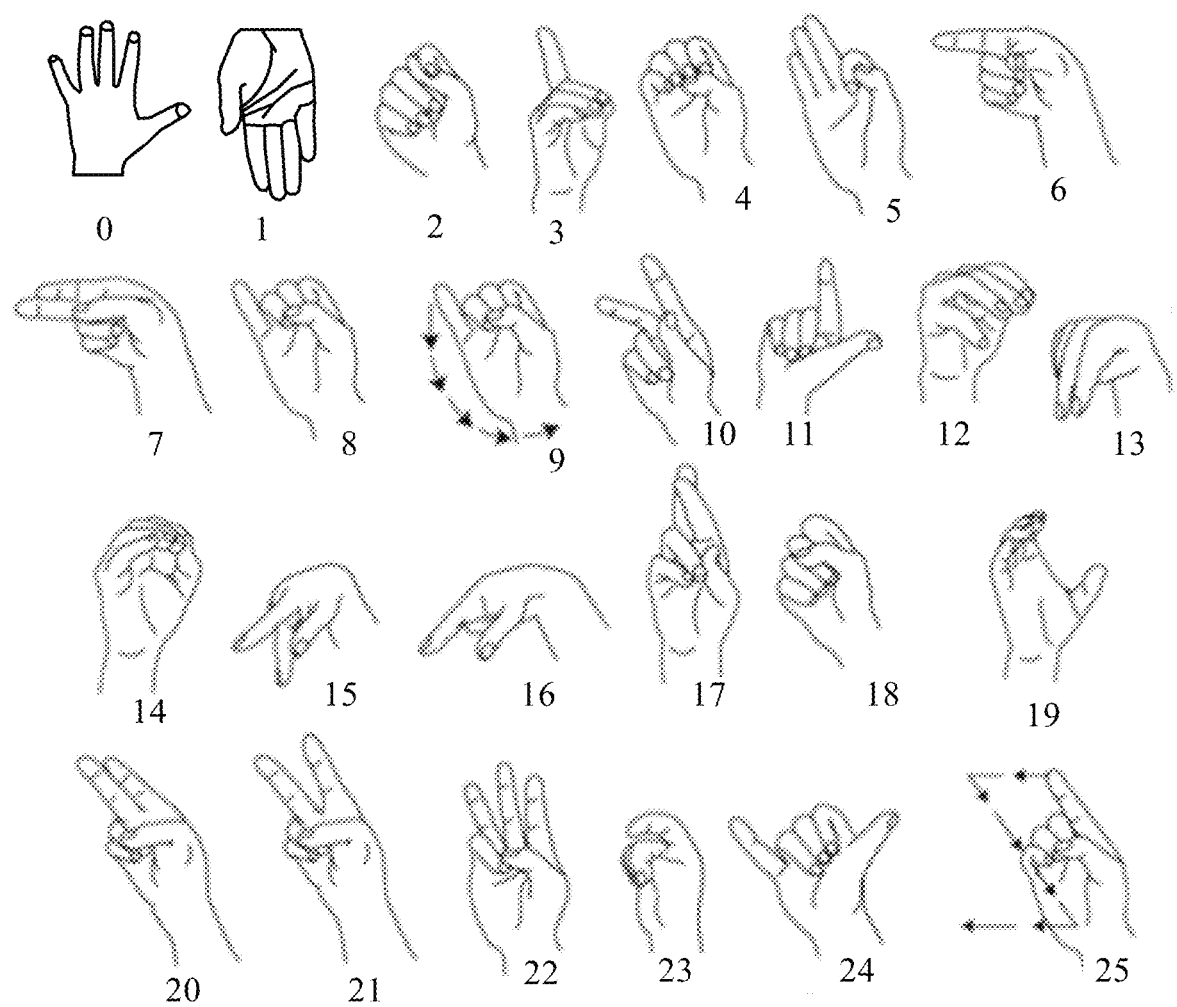
FIG. 2D is an example diagram illustrating air gestures provided in implementations of the disclosure.

As an example, the gesture action is represented by an air gesture. The air gesture includes a static gesture or a dynamic gesture. The static gesture refers to a hand posture at a certain moment, such as bending or folding fingers. As illustrated in FIG. 2D, the static gesture may be, for example, gesture 0 of "palm" (i.e., the palm faces the terminal, and the back of the hand faces user's eyes), gesture 1 of "back of the hand" (i.e., the back of the hand faces the terminal, and the palm faces user's eyes), gesture 2 of "making a fist", etc., which is not enumerated in detail herein. The dynamic gesture includes different gesture types, such as swiping up and down, swiping left and right, pressing, or drawing a Z shape, etc.

For a same air gesture, there may be slight differences in operation behaviors of different users, but characteristics of the gesture are basically the same.

In one possible example, after setting the first indication field according to the collected control action and before returning to determining whether the first indication field is in the initialization state, the method further includes the following. A sampling mode is adjusted from a first frame-rate mode to a second frame-rate mode, where a frame rate in the first frame-rate mode is lower than a frame rate in the second frame-rate mode; and/or a resolution mode is adjusted from a first resolution mode to a second resolution mode, where a resolution in the first resolution mode is lower than a resolution in the second resolution mode.

A frame rate in the second frame-rate mode is higher than a frame rate in the first frame-rate mode, and the resolution in the second resolution mode is higher than the resolution in the first resolution mode, and thus, power consumption in the second frame-rate mode and the second resolution mode is higher.

The frame rate in the first frame-rate mode may be, for example, 30 frames/second, and the frame rate in the second frame-rate mode may be, for example, 60 frames/second. The resolution in the first resolution mode may be, for example, 540*960 pixels, and the resolution in the second resolution mode may be, for example, 1080*1920 pixels.

As can be seen, in the example, by dynamically setting the sampling mode or the resolution mode, performance and power consumption are more balanced, thereby improving intelligence of control.

In one possible example, the gesture action B1 is represented by at least two gesture detection results, the gesture detection result refers to a user's gesture determined according to a gesture image, and the second indication field is set according to the collected gesture action B1 as follows. Whether no gesture, an invalid gesture, or a valid gesture exists in a gesture image currently collected is determined, where the gesture image currently collected is a gesture image most-recently-collected. If a valid gesture exists in the gesture image currently collected, a gesture detection result of the gesture image currently collected is added to a gesture action queue B2, and whether the number of gesture detection results in the gesture action queue B2 reaches N is determined, where N is a positive integer. If the number of gesture detection results in the gesture action queue B2 reaches N, the second indication field is set according to N gesture detection results in the gesture action queue B2, and the gesture action queue B2 is reset.

In one possible example, the method further includes the following. If the number of gesture detection results in the gesture action queue B2 fails to reach N, return to determining whether the first indication field is in the initialization state.

"No gesture" means that there is no image information of a human hand. "Invalid gesture" means that a gesture in a detected gesture image does not meet the preset association relationship. "Valid gesture" means that a gesture in a detected gesture image meets the preset association relationship. For example, a gesture in a reference gesture action corresponds to a predefined gesture action A1, a gesture information combination of the reference gesture action and the gesture action A1 corresponds to a predefined valid operation instruction. For instance, the gesture action A1 is the palm, and the reference gesture action corresponding to the gesture action A1 may be that "the palm is flipped to the back of the hand", in this case, the "valid gesture" may include the palm and the back of the hand.

N may be a value greater than 1, such as 2 or 3, which is not limited herein.

As can be seen, in the example, the gesture action B1 is constrained by the gesture action queue B2 and is represented by at least two gesture detection results. Multiple gesture detection results can more accurately and comprehensively correspond to a user's actual gesture action, which can avoid a noise influence caused when a single gesture detection result is an interference gesture such as an illegal gesture, thereby effectively improving accuracy of a detection result.

In one possible example, the method further includes the following. If no gesture or an invalid gesture exists in the gesture image currently collected, whether a detection duration C1 is longer than a preset duration C2 is determined, where the detection duration C1 is a duration in which no gesture or an invalid gesture is consecutively detected when the first indication field is not in the initialization state. If the detection duration C1 is longer than the preset duration C2, the second indication field and the detection duration C1 are reset, a sampling mode is adjusted to the first frame-rate mode, and return to determining whether the first indication field is in the initialization state. If the detection duration C1 is shorter than or equal to the preset duration C2, the detection duration C1 is updated, and return to determining whether the first indication field is in the initialization state.

The preset duration C2 may be, for example, 15 seconds, which is not limited herein.

As can be seen, in the example, a no-gesture recognition scenario or an invalid-gesture recognition scenario can be terminated through a duration constraint mechanism, and gesture control is performed again, which can avoid affecting a battery life due to keeping in the second frame-rate mode all the time.

In one possible example, the method further includes the following. Upon detecting that the gesture action B1 and the gesture action A1 fail to meet the preset association relationship, the second indication field is reset, and return to determining whether the first indication field is in the initialization state.

In one possible example, resetting the second indication field and returning to determining whether the first indication field is in the initialization state upon detecting that the gesture action B1 and the gesture action A1 fail to meet the preset association relationship include the following. ① Upon detecting that the gesture action B1 and the gesture action A1 fail to meet the preset association relationship and the N gesture detection results represent different gestures, the second indication field is reset, and return to determining whether the first indication field is in the initialization state. ② Upon detecting that the gesture action B1 and the gesture action A1 fail to meet the preset association relationship and gestures represented by the N gesture detection results are the same as a gesture of the gesture action A1, the second indication field is reset, and return to determining whether the first indication field is in the initialization state. ③ Upon detecting that the gesture action B1 and the gesture action A1 fail to meet the preset association relationship, the N gesture detection results represent a same gesture, and the gesture represented by the N gesture detection results is different from the gesture of the gesture action A1, whether a detection duration B3 is longer than a preset duration B4 is determined, where the detection duration B3 is a duration of a gesture indicated by the second indication field. If the detection duration B3 is longer than the preset duration B4, the first indication field, the second indication field, and the detection duration B3 are reset, and return to determining whether the first indication field is in the initialization state. If the detection duration B3 is shorter than or equal to the preset duration B4, the second indication field is reset, the detection duration B3 is updated, and return to determining whether the first indication field is in the initialization state.

The preset duration B4 may be, for example, 1.2 seconds, etc., which is not limited herein.

For branch ①, the gesture action B1 may be various illegal gestures, such as a return gesture of a reference gesture action corresponding to the gesture action A1. For instance, see Table 2, the gesture action A1 corresponding to a swipe-down operation instruction is a gesture action of the palm, and the reference gesture action corresponding to the gesture action A1 is that the palm is flipped to the back of the hand (where a flip direction is a top-down direction relative to a screen), the gesture action B1 in this branch is that the back of the hand is flipped to the palm (i.e., the return gesture of the reference gesture action), the terminal will reset the second indication field, and proceed to setting the second indication field according to the collected gesture action B1 because the first indication field is not in the initialization state. In such a cyclic manner, the gesture action B1 is detected repeatedly. As such, no valid response will be made to the illegal gesture, thereby improving control accuracy and intelligence.

For branch ②, the gesture action B1 may be that the gesture action A1 remains unchanged. In this situation, the terminal will reset the second indication field repeatedly, which can maintain validity of the gesture action A1 until the gesture action B1 is canceled or a valid operation is executed by a user, which can improve a real-time performance of control interaction.

For branch ③, the gesture action B1 may be a gesture action in a scenario of changing an operation instruction (e.g., a swipe-down operation instruction is changed to a swipe-up operation instruction). For instance, see Table 2, the swipe-down operation instruction corresponds to a gesture action of the palm and a gesture action that the palm is flipped to the back of the hand, and the swipe-up operation instruction corresponds to a gesture action of the back of the hand and a gesture action that the back of the hand is flipped to the palm. If the user executes a swipe-down operation and keeps the gesture action of the back of the hand unchanged for a duration longer than a preset duration, the terminal is triggered to reset the first indication field, the second indication field, and the detection duration B3 for redetection. Subsequently, the first indication field is set according to a detected gesture action of the back of the hand, and the second indication field is set according to a detected gesture action of flipping the back of the hand to the palm. Upon detecting that the preset association relationship is met, a swipe-up operation is determined and executed. As such, flexible and coherent switching between operation instructions can be realized.

In one possible example, the first indication field is set according to the collected control action as follows. Whether no gesture, an invalid gesture, or a valid gesture exists in a gesture image currently collected is determined, where the gesture image currently collected is a gesture image most-recently-collected. If a valid gesture exists in the gesture image currently collected, a gesture detection result of the gesture image currently collected is added to a gesture action queue A2, and existence of M consecutive and identical gesture detection results in the gesture action queue A2 is determined, where M is a positive integer. If the M consecutive and identical gesture detection results exist in the gesture action queue A2, the first indication field is set according to the M consecutive and identical gesture detection results, and the gesture action queue A2 is reset.

M may be 3, 4, 5, etc., which is not limited herein.

As can be seen, in the example, the terminal can accurately determine a user's active control intention by continuously detecting multiple identical gestures, which can prevent noise caused by an illegal gesture from affecting detection accuracy, thereby improving detection success rate.

In one possible example, the method further includes the following. If no M consecutive and identical gesture detection results exists in the gesture action queue A2, return to determining whether the first indication field is in the initialization state. If no gesture or an invalid gesture exists in the gesture image currently collected, a detection duration A3 is obtained, and whether the detection duration A3 is longer than a preset duration A4 is determined, where the detection duration A3 is a duration in which no gesture or an invalid gesture is consecutively detected when the first indication field is in the initialization state. If the detection duration A3 is longer than the preset duration A4, the detection duration A3 is reset, and whether a current sampling mode is the second frame-rate mode is determined. The sampling mode is set to the first frame-rate mode if the current sampling mode is the second frame-rate mode; and return to determining whether the first indication field is in the initialization state if the current sampling mode is not the second frame-rate mode. If the detection duration A3 is shorter than or equal to the preset duration A4, the detection duration A3 is updated, and return to determining whether the first indication field is in the initialization state.

The preset duration A4 may be 15 seconds, etc., which is not limited herein.

As can be seen, in the example, continuous power consumption in the second frame-rate mode can be avoided through constraint of the preset duration A4, thereby avoid affecting a battery life.

In one possible example, the first indication field is represented by at least one of a gesture identification or an instruction identity (ID), and the second indication field is represented by at least one of a gesture identification or an instruction ID.

In one possible example, the first indication field is represented by a first gesture identification, the second indication field is represented by a second gesture identification, and the target operation instruction is determined according to the first indication field and the second indication field as follows. Query a preset operation-instruction set according to a target gesture information combination of the first gesture identification and the second gesture identification, to obtain the target operation instruction corresponding to the target gesture information combination, where the operation-instruction set includes a correspondence between gesture information combinations and operation instructions.

The gesture identification refers to identification information of a gesture type, for example, "the palm" is represented by identification information of "0". The instruction ID refers to identification information of an operation instruction, for example, a swipe-down operation instruction is represented by identification information of "X", etc.

Alternatively, the first indication field is represented by a first instruction ID, the second indication field is represented by a second instruction ID, and the target operation instruction is determined according to the first indication field and the second indication field as follows. The target operation instruction is determined according to the first instruction ID and the second instruction ID.

The first instruction ID is determined as follows. A first gesture information combination is determined according to the gesture action A1. Query the preset operation-instruction set according to the first gesture information combination. A corresponding first reference operation instruction is determined. The first instruction ID is determined according to the first reference operation instruction. The second instruction ID is determined as follows. A second gesture information combination is determined according to the gesture action B1. Query the preset operation-instruction set according to the second gesture information combination. A corresponding second reference operation instruction is determined. The second instruction ID is determined according to the second reference operation instruction.

The first reference operation instruction and the second reference operation instruction each are an operation instruction in the operation-instruction set.

In one possible example, the first indication field is represented by the first gesture identification (e.g., a representation method in a first-indication-field column in Table 2), after the first indication field is set according to the collected control action, the method further includes displaying prompt information of the first gesture identification.

In one possible example, the first indication field is represented by the first instruction ID, after the first indication field is set according to the collected control action, the method further includes the following. Prompt information of the first instruction ID is displayed, and/or information of a gesture detection result of a gesture image corresponding to the collected control action is displayed.

The prompt information of the first gesture identification may be prompt information of a first gesture, and may be in a form of a picture, a text, an animation, etc. The prompt information of the first instruction ID may be prompt information of a first reference operation instruction, and may be in a form of a picture, a text, an animation, etc.

As can be seen, in the example, interactivity is enhanced through information display, and a control process is more visible and intuitive, thereby improving a user experience.

As can be seen, in implementations of the disclosure, the terminal records the user's control action through the first indication field and records the user's gesture action B1 through the second indication field, where the timing of the control action is prior to the timing of the gesture action B1. When the gesture action B1 and the control action meet the preset association relationship, the terminal further determines the target operation instruction according to the first indication field and the second indication field, and executes the target operation instruction. As such, control accuracy can be improved based on a combination of actions corresponding to the above two indication fields. Furthermore, the terminal resets only the second indication field and repeatedly executes the method for gesture control, since only the second indication field is reset and the first indication field is still valid, the terminal can be triggered to continuously execute the target operation instruction through repeated user's gesture action B1, and does not need to repeatedly detect the control action associated with the first indication field, thus reducing time consumption caused by repeated control. Moreover, the gesture action B1 is represented by at least two gesture detection results, that is, the gesture action B1 can be an air gesture action composed of same or different gestures, which expands an application scope of the gesture action, and is beneficial to improving accuracy, smoothness, and comprehensiveness of air gesture control.

In addition, it should be noted that, the gesture action A1 of the disclosure may be, but is not limited to, a gesture action determined according to same gesture detection result. The gesture action A1 may also be a gesture action that meets predefined hand action rules and is determined according to different gesture detection results, such as a gesture action of changing gestures, for example, a gesture action of turning a palm to a clenched fist.

In a specific implementation mechanism, the terminal needs to pre-store a predefined valid gesture action, and for detection of an element in the gesture action queue A2, comparison is done according to the predefined gesture action. The predefined gesture action may contain different gestures, thus the terminal needs to check whether elements in gesture action queue A2 include different gestures.

Also, the gesture action B1 is not limited to a gesture action containing different gestures, and may also be a gesture action containing the same gesture.

For example: ① a gesture of a hand remains unchanged, but a direction and/or a position of the hand relative to a terminal screen is changed.

In a specific implementation mechanism, the terminal records a detected gesture detection result through the gesture action queue B2. Upon detecting that the gesture action queue B2 contains two gesture detection results, the second indication field is set according to the two valid gesture detection results. For example, the first indication field and the second indication field each record a gesture type, then according to a gesture information combination of the second indication field and the first indication field, the terminal can directly search a pre-stored operation-instruction set for a corresponding target operation instruction. In other words, the operation-instruction set contains a correspondence between gesture information combinations and operation instructions.

Further, the gesture detection result also includes a position and/or a direction of the hand, a movement direction and a distance (relative to the terminal screen) of a same gesture can be further determined according to the gesture detection result. For instance, in a scenario of swiping with the palm, detection of the gesture action A1 is still based on gesture detection, and detection of the gesture action B1 further relates to a position and/or a direction of a gesture, to determine the target operation instruction.

Figure 3A:
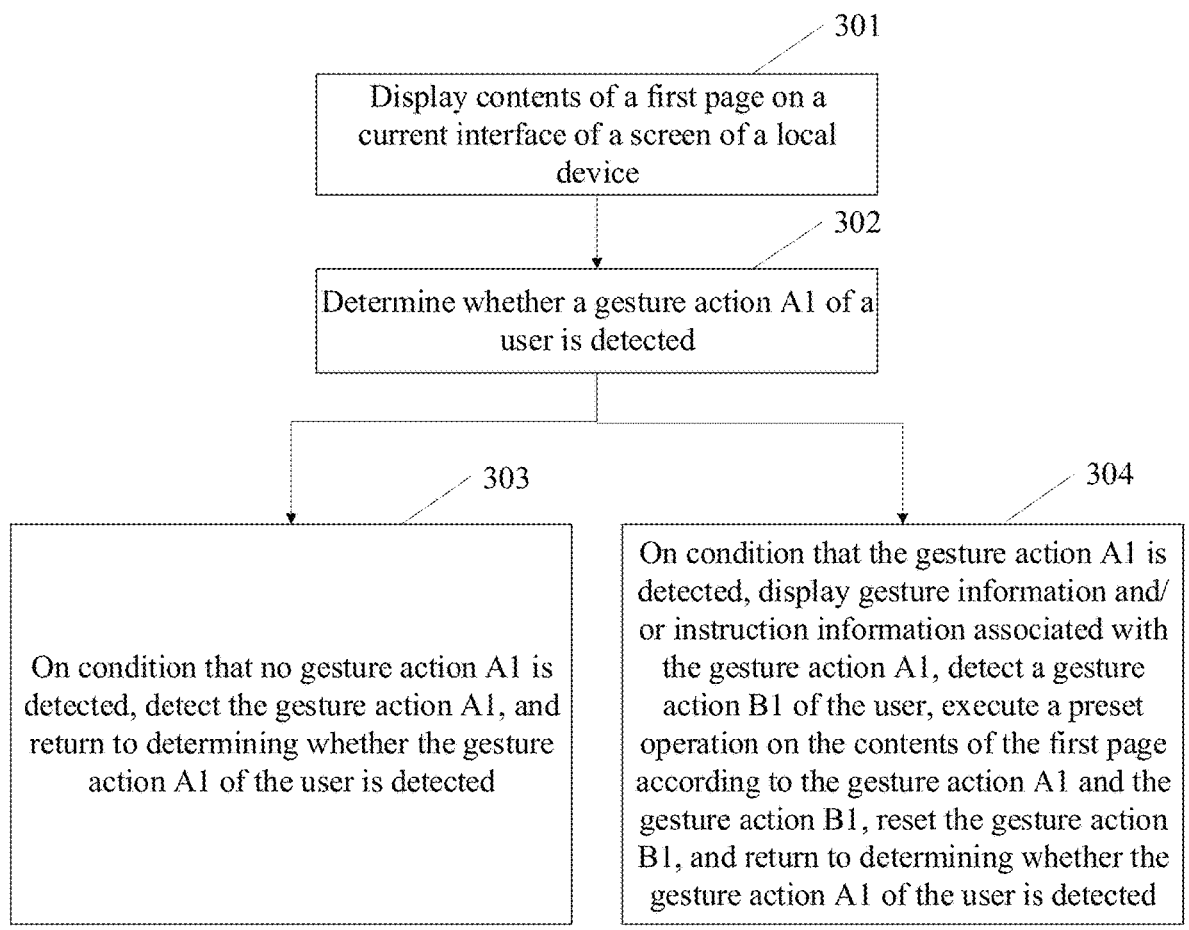
FIG. 3A is a schematic flowchart illustrating a method for gesture control provided in other implementations of the disclosure.

A correspondence relationship among the gesture action A1 (represented by elements in the gesture action queue A2), the first indication field, the gesture action B1 (represented by elements in the gesture action queue B2), the second indication field, and the target operation instruction will be exemplarily illustrated in Table 2.

mentations of the disclosure. As illustrated in FIG. 3A, the method includes the following.

At 301, contents of a first page are displayed on a current interface of a screen of a local device.

The contents of the first page may be contents of a web page, contents of a chat interface, etc., which are not limited herein.

At 302, determine whether a user's gesture action A1 is detected, where the gesture action A1 is a hand action of the same gesture whose duration is longer than a preset duration.

The gesture action A1 may be a static gesture or a dynamic gesture, which is not limited herein. In a specific implementation, the user's gesture action is detected through a mechanism of the gesture action queue A2 and the first indication field.

At 303, if no gesture action A1 is detected, detect the gesture action A1, and return to determining whether the user's gesture action A1 is detected.

The visualization information may be in a form of a picture, a text, an animation, etc., which is not limited herein.

In a specific implementation, the gesture information and/or the instruction information may be displayed for a preset duration, where the preset duration may be, for example, 100 milliseconds, 200 milliseconds, etc., which is not limited herein.

At 304, if the gesture action A1 is detected, gesture information and/or instruction information associated with the gesture action A1 are displayed, detect a user's gesture action B1, a preset operation is executed on the contents of the first page according to the gesture action A1 and the gesture action B1, the gesture action B1 is reset, and return to determining whether the user's gesture action A1 is detected, where the gesture information is visualization information of hand movement of the gesture action A1, and the instruction information is visualization information of a reference operation instruction associated with the gesture action A1.

TABLE 2

| Gesture action A1 | Gesture action queue A2 | First indication field | Gesture action B1 | Gesture action queue B2 | Second indication field | Target operation instruction |
|---|---|---|---|---|---|---|
| Palm | 000 | 0 | The palm is flipped to the back of the hand | 0, 1 | 0, 1 | Swipe down |
| Back of hand | 111 | 1 | The back of the hand is flipped to the palm | 1, 0 | 1, 0 | Swipe up |
| The palm is flipped to the back of the hand | 0, 1 | 2 | The palm is flipped to the back of the hand | 0, 1 | 0, 1 | Swipe left |
| The back of the hand is flipped to the palm | 1, 0 | 3 | The back of the hand is flipped to the palm | 1, 0 | 1, 0 | Swipe right |
| Palm | 000 | 0 | Clenched fist | 0, 2 | 2 | Screenshot |
| Palm | 000 | 0 | Palm swinging downward | (0, position 1), (0, position 2) | (0, movement direction of "downward") | Return to desktop |

The movement direction of "downward" in table 2 can be calculated and determined according to position 1 and position 2. Also, Table 2 exemplarily illustrates setting of the first indication field according to three consecutive and identical elements (corresponding to three consecutive and identical gesture detection results, that is, M=3) and setting of the second indication field according to two elements (corresponding to two gesture detection results, that is, N=2).

Referring to FIG. 3A, FIG. 3A is a schematic flowchart illustrating a method for gesture control provided in imple- The gesture action B1 is represented by at least two gesture detection results. The gesture action A1 and the gesture action B1 each are an air gesture. The air gesture refers to a non-contact (or contactless) gesture control operation. The gesture detection result refers to a user's gesture determined according to a detected gesture image.

The preset operation may include at least one of swipe up, swipe down, screenshot, return to desktop, return to previous menu, go to a next menu, pause, or play.

In one possible example, if the preset operation is swipe down, return to a desktop, return to a previous menu, or pause, a gesture corresponding to the gesture action A1 is a palm, and a gesture corresponding to the gesture action B1 is that the palm is flipped to the back of the hand, where a downward direction of flipping is consistent with a downward direction of the screen of the local device. If the preset operation is swipe up, jump to a next menu, or play, the gesture corresponding to the gesture action A1 is the back of the hand, and the gesture corresponding to the gesture action B1 is that the back of the hand is flipped to the palm, where an upward direction of flipping is consistent with an upward direction of the screen of the local device. If the preset operation is screenshot, the gesture corresponding to the gesture action A1 is the palm, and the gesture corresponding to the gesture action B1 is that the palm is turned to a clenched fist.

Figure 3B:
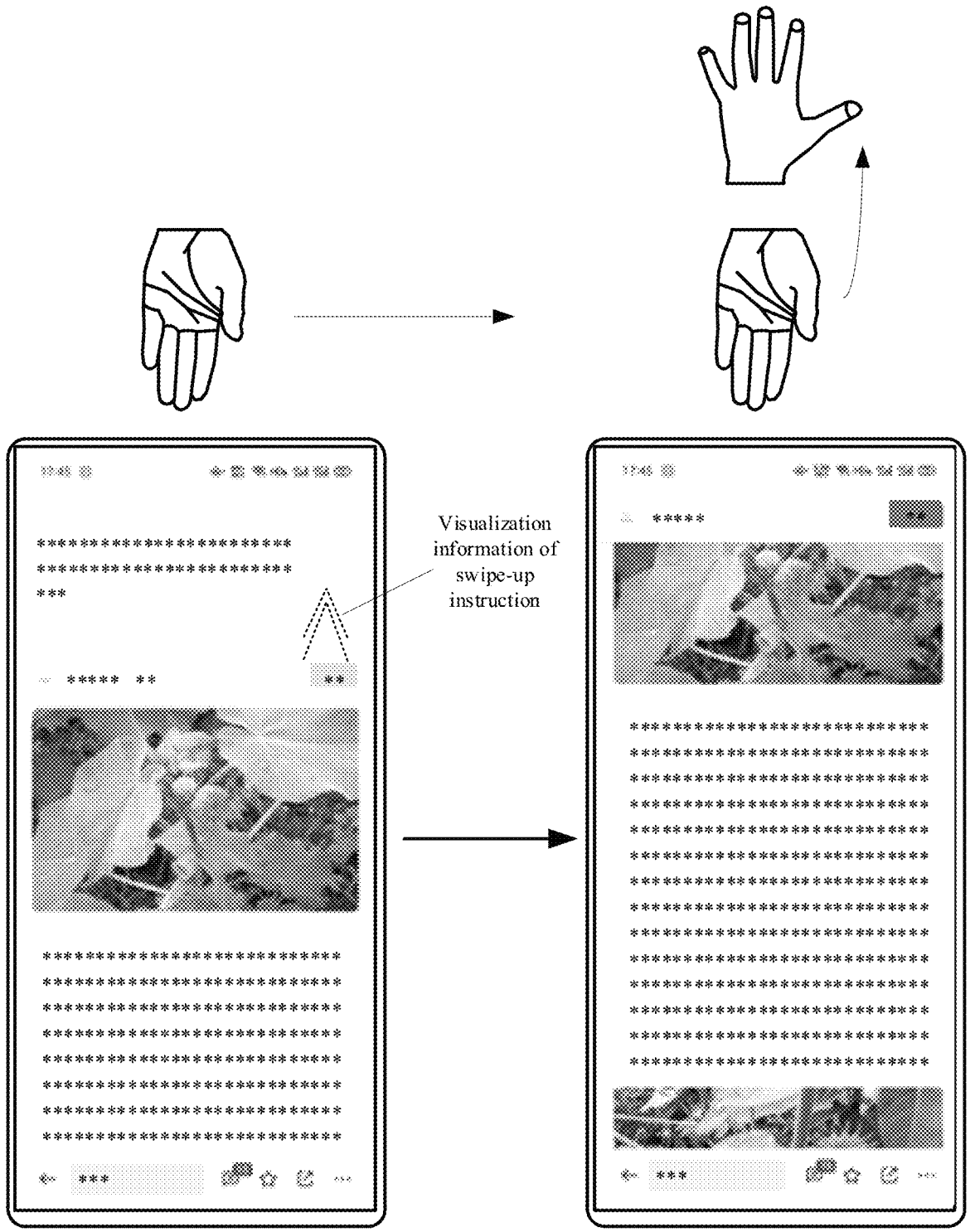
FIG. 3B is a schematic diagram illustrating inputting of a swipe-up operation instruction by flipping to the palm from the back of the hand provided in implementations of the disclosure.

As an example, as illustrated in FIG. 3B, the gesture action A1 is a gesture action of the back of the hand, the gesture action B1 is a gesture action that the back of the hand is flipped to the palm, a preset operation is a swipe-up operation, and displayed information can be instruction information. Specifically, the instruction information is a swipe-up icon associated with the gesture action of the back of the hand.

Figure 3C:
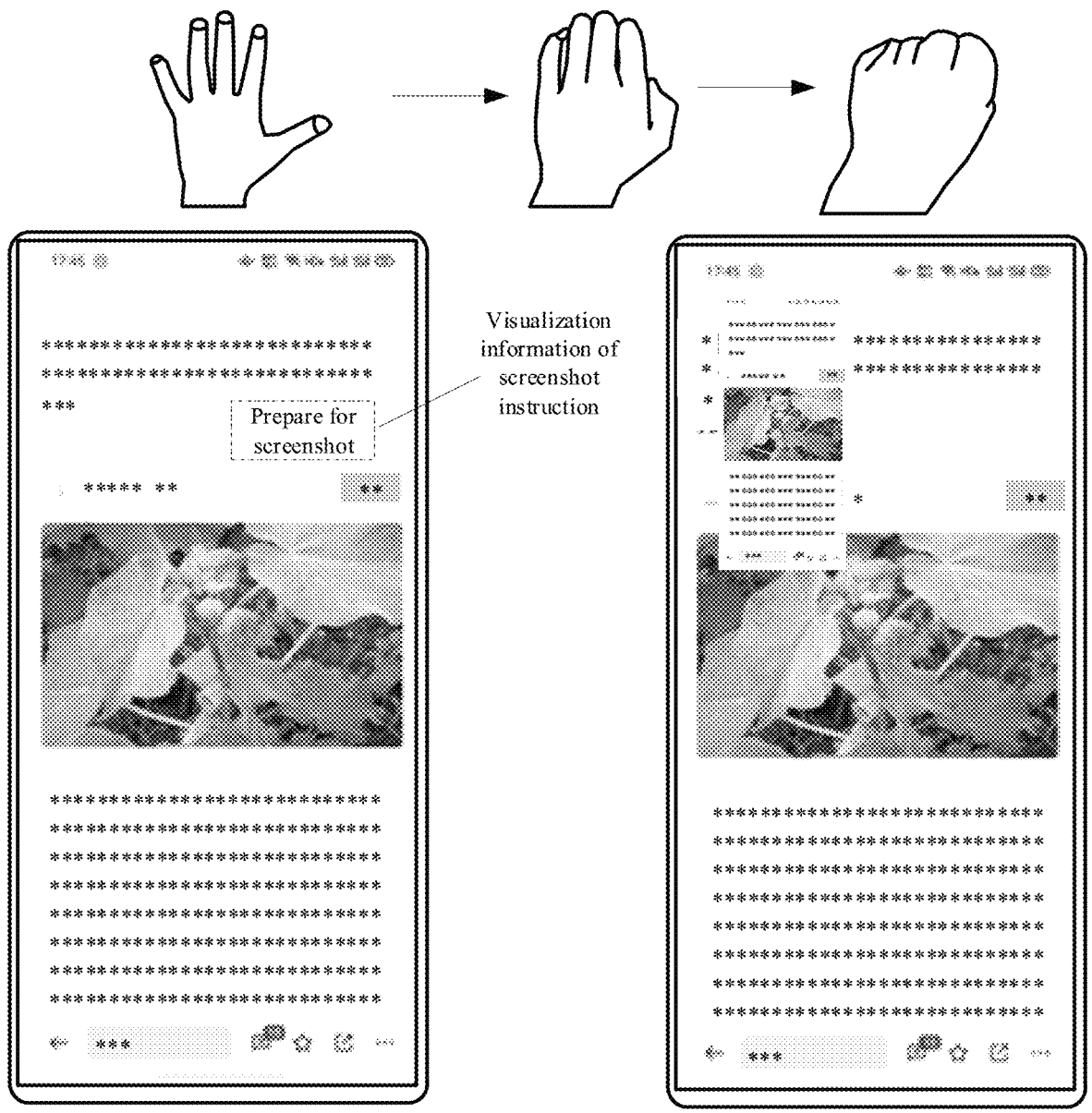
FIG. 3C is a schematic diagram illustrating inputting of a screenshot instruction by turning the palm to a clenched fist provided in implementations of the disclosure.

As another example, as illustrated in FIG. 3C, in a scenario of a screenshot function, the gesture action A1 is a gesture action of the palm (relative to a detection direction of the terminal, and consistent with (e.g., substantially parallel to) a height direction of a screen of a mobile phone), the target operation instruction is a screenshot instruction, and the gesture action B1 is a gesture action of a clenched fist (relative to the detection direction of the terminal). A user can enter the screenshot instruction by turning the palm to the clenched fist. In response to detecting the gesture action of the palm, an electronic device is triggered to display prompt information of "prepare for screenshot" on a current passive call interface. Then, the electronic device displays a screenshot thumbnail on the passive call interface upon detecting that the gesture action of the palm is turned to the gesture action of the clenched fist.

It can be understood that, the gesture action B1 may also be a gesture action composed of two or more gestures, and the gesture action composed of more than two gestures is similar to the gesture action composed of two gestures in terms of principle, which will not be repeated herein.

In one possible example, the swipe down is to move the contents of the first page downward by a preset number of pixels, to adjust contents displayed on the current interface to contents of a second page from the contents of the first page. The swipe up is to move the contents of the first page upward by a preset number of pixels, to adjust the contents displayed on the current interface to contents of a third page from the contents of the first page.

As can be seen, in the example, in a specific application scenario, a combination of the gesture action A1 and the gesture action B1 can realize a variety of different operations, thereby improving application comprehensiveness and application flexibility.

In one possible example, detecting the gesture action A1 is as follows. A first indication field is set according to a gesture image collected, and a sampling mode is adjusted from a first frame-rate mode to a second frame-rate mode, where a frame rate in the first frame-rate mode is lower than a frame rate in the second frame-rate mode, and the first indication field is associated with the gesture action A1. Detecting the user's gesture action B1 is as follows. A second indication field is set according to a gesture action B1 collected, where the second indication field is associated with the user's gesture action B1. The preset operation is executed on the contents of the first page according to the gesture action A1 and the gesture action B1 as follows. Upon detecting that the gesture action B1 and the gesture action A1 meet a preset association relationship, a target operation instruction is determined according to the first indication field and the second indication field, and a preset operation corresponding to the target operation instruction is executed on the contents of the first page.

In one possible example, the gesture action B1 is represented by at least two gesture detection results, the gesture detection result refer to a user's gesture determined according to a gesture image, and the second indication field is set according to the collected gesture action B1 as follows. Whether no gesture, an invalid gesture, or a valid gesture exists in a gesture image currently collected is determined, where the gesture image currently collected is a gesture image most-recently-collected. If a valid gesture exists in the gesture image currently collected, a gesture detection result of the gesture image currently collected is added to a gesture action queue B2, and whether the number of gesture detection results in the gesture action queue B2 reaches N is determined, where N is a positive integer. If the number of gesture detection results in the gesture action queue B2 reaches N, the second indication field is set according to N gesture detection results in the gesture action queue B2, and the gesture action queue B2 is reset.

In one possible example, the method further includes the following. If the number of gesture detection results in the gesture action queue B2 fails to reach N, return to determining whether the first indication field is in the initialization state.

As can be seen, in the example, the gesture action B1 is constrained by the gesture action queue B2 and is represented by at least two gesture detection results. Multiple gesture detection results can more accurately and comprehensively correspond to a user's actual gesture action, which can avoid a noise influence caused when a single gesture detection result is an interference gesture such as an illegal gesture, thereby effectively improving accuracy of a detection result.

In one possible example, the method further includes the following. If no gesture or an invalid gesture exists in the gesture image currently collected, whether a detection duration C1 is longer than a preset duration C2 is determined, where the detection duration C1 is a duration in which no gesture or an invalid gesture is consecutively detected when the first indication field is not in the initialization state. If the detection duration C1 is longer than the preset duration C2, the second indication field and the detection duration C1 are reset, a sampling mode is adjusted to the first frame-rate mode, and return to determining whether the first indication field is in the initialization state. If the detection duration C1 is shorter than or equal to the preset duration C2, the detection duration C1 is updated, and return to determining whether the first indication field is in the initialization state.

As can be seen, in the example, a no-gesture recognition scenario or an invalid-gesture recognition scenario can be terminated through a duration constraint mechanism, and gesture control is performed again, which can avoid affecting a battery life due to keeping in the second frame-rate mode all the time.

In one possible example, the method further includes the following. Upon detecting that the gesture action B1 and the gesture action A1 fail to meet the preset association relationship, the second indication field is reset, and return to determining whether the first indication field is in the initialization state.

In one possible example, resetting the second indication field and returning to determining whether the first indication field is in the initialization state upon detecting that the gesture action B1 and the gesture action A1 fail to meet the preset association relationship include the following. ① Upon detecting that the gesture action B1 and the gesture action A1 fail to meet the preset association relationship and the N gesture detection results represent different gestures, the second indication field is reset, and return to determining whether the first indication field is in the initialization state. ② Upon detecting that the gesture action B1 and the gesture action A1 fail to meet the preset association relationship and gestures represented by the N gesture detection results are the same as a gesture of the gesture action A1, the second indication field is reset, and return to determining whether the first indication field is in the initialization state. ③ Upon detecting that the gesture action B1 and the gesture action A1 fail to meet the preset association relationship, the N gesture detection results represent a same gesture, and the gesture represented by the N gesture detection results is different from the gesture of the gesture action A1, whether a detection duration B3 is longer than a preset duration B4 is determined, where the detection duration B3 is a duration of a gesture indicated by the second indication field. If the detection duration B3 is longer than the preset duration B4, the first indication field, the second indication field, and the detection duration B3 are reset, and return to determining whether the first indication field is in the initialization state. If the detection duration B3 is shorter than or equal to the preset duration B4, the second indication field and the detection duration B3 are reset, and return to determining whether the first indication field is in the initialization state.

For branch ①, the gesture action B1 may be a return gesture of a reference gesture action corresponding to the gesture action A1. For instance, see Table 2, the gesture action A1 corresponding to a swipe-down operation instruction is a gesture action of the palm, and the reference gesture action corresponding to the gesture action A1 is that the palm is flipped to the back of the hand (where a flip direction is a top-down direction relative to a screen), if the gesture action B1 in this branch is that the back of the hand is flipped to the palm (i.e., the return gesture of the reference gesture action), the terminal will reset the second indication field, and proceed to setting the second indication field according to the collected gesture action B1 because the first indication field is not in the initialization state. In such a cyclic manner, the gesture action B1 is detected repeatedly. As such, no valid response will be made to the illegal gesture, thereby improving control accuracy and intelligence.

For branch ②, the gesture action B1 may be that the gesture action A1 remains unchanged. In this situation, the terminal will reset the second indication field repeatedly, which can maintain validity of the gesture action A1 until the gesture action B1 is canceled or a valid operation is executed by a user, which can improve a real-time performance of control interaction.

For branch ③, the gesture action B1 may be a gesture action in a scenario of changing an operation instruction (e.g., a swipe-down operation instruction is changed to a swipe-up operation instruction). For instance, see Table 2, the swipe-down operation instruction corresponds to a gesture action of the palm and a gesture action that the palm is flipped to the back of the hand, and the swipe-up operation instruction corresponds to a gesture action of the back of the hand and a gesture action that the back of the hand is flipped to the palm. If the user executes a swipe-down operation and keeps the gesture action of the back of the hand unchanged for a duration longer than a preset duration, the terminal is triggered to reset the first indication field, the second indication field, and the detection duration B3 for redetection. Subsequently, the first indication field is set according to a detected gesture action of the back of the hand, and the second indication field is set according to a detected gesture action of flipping the back of the hand to the palm. Upon detecting that the preset association relationship is met, a swipe-up operation is determined and executed. As such, flexible and coherent switching between operation instructions can be realized.

In one possible example, the first indication field is set according to the collected control action as follows. Whether no gesture, an invalid gesture, or a valid gesture exists in a gesture image currently collected is determined, where the gesture image currently collected is a gesture image most-recently-collected. If a valid gesture exists in the gesture image currently collected, a gesture detection result of the gesture image currently collected is added to a gesture action queue A2, and existence of M consecutive and identical gesture detection results in the gesture action queue A2 is determined, where M is a positive integer. If the M consecutive and identical gesture detection results exist in the gesture action queue A2, the first indication field is set according to the M consecutive and identical gesture detection results, and the gesture action queue A2 is reset.

As can be seen, in the example, the terminal can accurately determine a user's active control intention by continuously detecting multiple identical gestures, which can prevent noise caused by an illegal gesture from affecting detection accuracy, thereby improving detection success rate.

In one possible example, the method further includes the following. If no M consecutive and identical gesture detection results exists in the gesture action queue A2, return to determining whether the first indication field is in the initialization state. If no gesture or an invalid gesture exists in the gesture image currently collected, a detection duration A3 is obtained, and whether the detection duration A3 is longer than a preset duration A4 is determined, where the detection duration A3 is a duration in which no gesture or an invalid gesture is consecutively detected when the first indication field is in the initialization state. If the detection duration A3 is longer than the preset duration A4, the detection duration A3 is reset, and whether a current sampling mode is the second frame-rate mode is determined. The sampling mode is set to the first frame-rate mode if the current sampling mode is the second frame-rate mode; and return to determining whether the first indication field is in the initialization state if the current sampling mode is not the second frame-rate mode. If the detection duration A3 is shorter than or equal to the preset duration A4, the detection duration A3 is updated, and return to determining whether the first indication field is in the initialization state.

As can be seen, in the example, continuous power consumption in the second frame-rate mode can be avoided through constraint of the preset duration A4, thereby avoid affecting a battery life.

In one possible example, the first indication field is represented by at least one of a gesture identification or an instruction ID, and the second indication field is represented by at least one of a gesture identification or an instruction ID.

In one possible example, the first indication field is represented by a first gesture identification, the second indication field is represented by a second gesture identification, and the target operation instruction is determined according to the first indication field and the second indication field as follows. Query a preset operation-instruction set according to a target gesture information combination of the first gesture identification and the second gesture identification, to obtain the target operation instruction corresponding to the target gesture information combination, where the operation-instruction set includes a correspondence between gesture information combinations and operation instructions. Alternatively, the first indication field is represented by a first instruction ID, the second indication field is represented by a second instruction ID, and the target operation instruction is determined according to the first indication field and the second indication field as follows. The target operation instruction is determined according to the first instruction ID and the second instruction ID.

In one possible example, the first indication field is represented by the first gesture identification, and the gesture information and/or the instruction information associated with the gesture action A1 is displayed as follows. Prompt information of the first gesture identification is displayed.

In one possible example, the first indication field is represented by the first instruction ID, and the gesture information and/or the instruction information associated with the gesture action A1 is displayed as follows. Prompt information of the first instruction ID is displayed, and/or information of a gesture detection result corresponding to a collected gesture image is displayed.

As can be seen, in the example, interactivity is enhanced through information display, and a control process is more visible and intuitive, thereby improving a user experience.

As can be seen, in implementations of the disclosure, in a page display scenario, by detecting the user's gesture action A1 and the user's gesture action B1 subsequent to the gesture action A1, the terminal executes the preset operation on the contents of the first page according to an action combination of the gesture action A1 and the gesture action B1. When the gesture action A1 is detected, the gesture information and/or the instruction information associated with the gesture action A1 is displayed in real time, to intuitively prompt the user whether a current detection process is accurate, which can enhance a user's sense of participation. In addition, after completing the preset operation, the gesture action B1 is reset while keeping validity of the gesture action A1, so that the gesture action A1 does not need to be repeatedly executed, and continuous control of execution of the preset operation can be completed only by repeatedly executing the gesture action B1, which can reduce time consumption and improve intuitiveness, smoothness, and comprehensiveness of air gesture control.

Specifically, the method for gesture control of implementations of the disclosure may be implemented by a state machine.

Figure 3D:
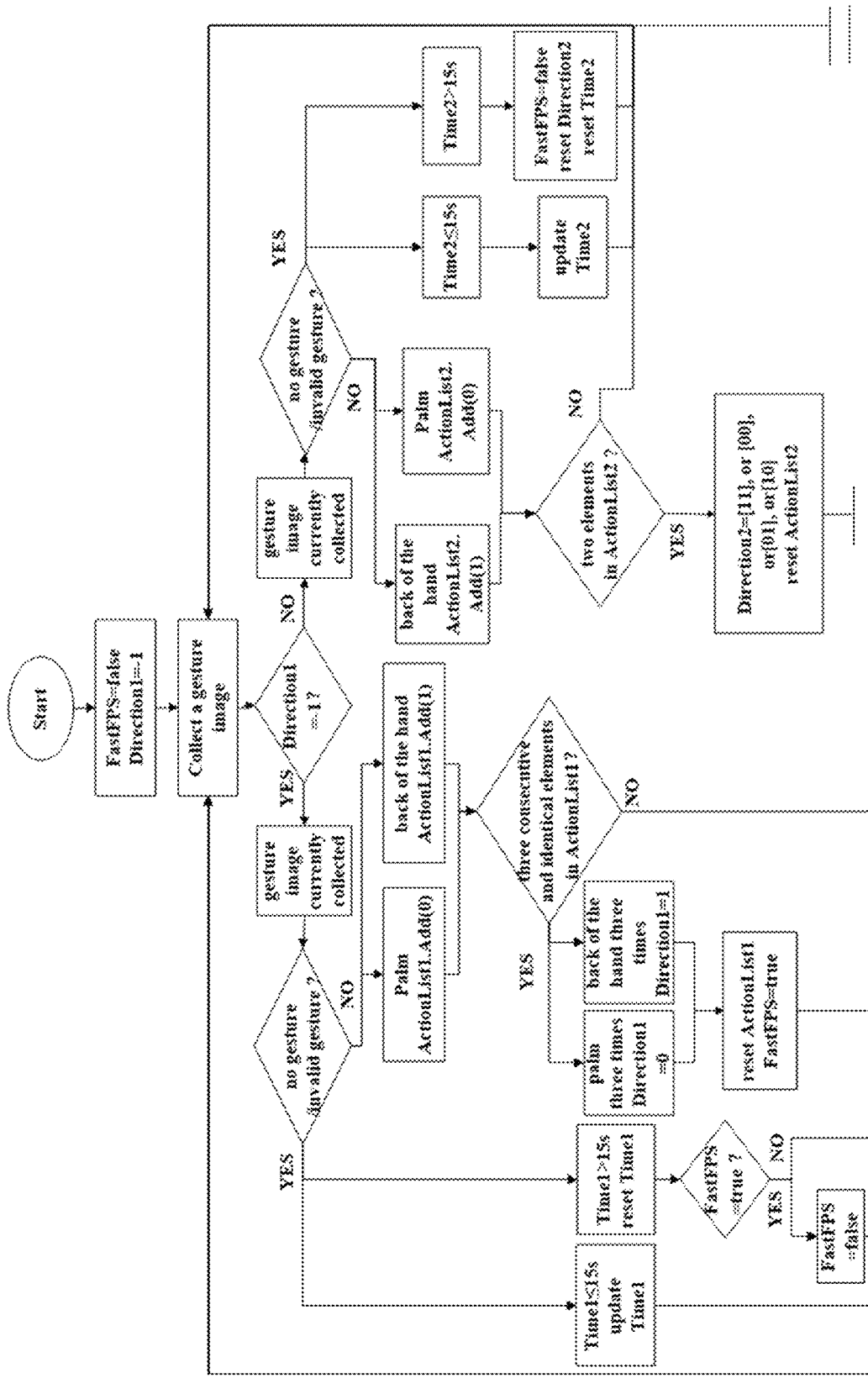
FIG. 3D is an implementation logic diagram of a state machine for realizing gesture recognition provided in implementations of the disclosure.

As an example, FIG. 3D is an implementation logic diagram of a state machine for realizing gesture recognition. "FastFPS=true" corresponds to the second frame-rate mode, and "FastFPS=false" corresponds to the first frame-rate mode. The first indication field is "Direction1", the gesture action queue A2 is "ActionList1", the second indication field is "Direction2", and the gesture action queue B2 is "ActionList2". Consecutive three gesture actions of the palm correspond to "Direction1=0". The gesture action that the palm is flipped to the back of the hand corresponds to "Direction2=[0, 1]". Consecutive three gesture actions of the back of the hand correspond to "Direction1=1". The gesture action that the back of the hand is flipped to the palm corresponds to "Direction2=[1, 0]". The detection duration A3 is "Time1", and the preset duration A4 is 15 seconds. The detection duration C1 is "Time2", and the preset duration C2 is 15 seconds. The detection duration B3 is "Time3", and the preset duration B4 is 1.2 seconds. A correspondence relationship between combinations of Direction1 and Direction2 and operation instructions is illustrated in Table 3.

TABLE 3

| Direction1 | Direction2 | Operation instruction |
|---|---|---|
| 0 | [0, 1] | swipe down |
| 1 | [1, 0] | swipe up |

An exemplary execution process is as follows.

A terminal enables a gesture control function, and executes an initialization operation first, that is, FastFPS=false, and Direction1=−1.

Further, the terminal collects a gesture image, and determines whether Direction1 is equal to −1.

If Direction1 is equal to −1, whether no gesture, an invalid gesture, or a valid gesture exists in the gesture image currently collected is determined.

If no gesture or an invalid gesture exists in the gesture image currently collected, whether Time1 is longer than 15 seconds is determined. If Time1 is longer than 15 seconds, reset Time1, and determine whether FastFPS indicates "true". If FastFPS indicates "true", FastFPS is reset to indicate "false", and return to collecting of the gesture image; if FastFPS indicates "false", return to collecting of the gesture image. Conversely, if Time1 is shorter than or equal to 15 seconds, update Time1, and return to collecting of the gesture image.

Conversely, if a valid gesture exists in the gesture image currently collected, a gesture detection result is added to the gesture action queue A2. Specifically, see Table 2, if the gesture detection result is the palm, ActionList1 is increased by 0; if the gesture detection result is the back of the hand, ActionList1 is increased by 1. Determine existence of three consecutive and identical elements in ActionList1. If three consecutive and identical elements exist in ActionList1, the first indication field is set according to the three consecutive and identical elements (e.g., if there are three elements of the palm, set Direction1=0; if there are three elements of the back of the hand, set Direction1=1), reset ActionList1, set FastFPS=true, and return to collecting of the gesture image. Conversely, if no three consecutive and identical elements exists in ActionList1, return to collecting of the gesture image.

Conversely, if Direction1 is not equal to −1, whether no gesture, an invalid gesture, or a valid gesture exists in the gesture image currently collected is determined.

If no gesture or an invalid gesture exists in the gesture image currently collected, whether Time2 is longer than 15 seconds is determined. If Time2 is longer than 15 seconds, set FastFPS=false, reset Direction2, reset Time2, and return to collecting of the gesture image. If Time2 is shorter than or equal to 15 seconds, update Time2, and return to collecting of the gesture image.

Conversely, if a valid gesture exists in the gesture image currently collected, a gesture detection result is added to the gesture action queue B2. Specifically, see Table 2, if the gesture detection result is the palm, ActionList2 is increased by 0; if the gesture detection result is the back of the hand, ActionList2 is increased by 1. Whether the number of elements in ActionList2 reaches two is determined. If two elements exist in ActionList2, Direction2 (e.g., Direction2=[11], or [00], or [01], or [10]) is set according to the two elements, reset ActionList2, and determine whether Direction1 and Direction2 meet a preset association relationship. If no two elements exists in ActionList2, return to collecting of the gesture image.

If the preset association relationship is met, a target operation instruction is determined according to Direction1 and Direction2. Specifically, see Table 2, a swipe-down operation is determined according to Direction2=0,1 and Direction1=0; a swipe-up operation is determined according to Direction2=1,0 and Direction1=1. Reset Direction2, and return to collecting of the gesture image.

Conversely, if the preset association relationship is not met, whether gestures associated with Direction2 are the same is detected. If the gestures associated with Direction2 are different, reset Direction2, and return to collecting of the gesture image. Conversely, if the gestures associated with Direction2 are the same, whether the gestures associated with Direction2 are the same as gestures associated with Direction1 is determined.

If the gestures associated with Direction2 are different from the gestures associated with Direction1, determine whether Time3 exceeds 1.2 s. If Time3 exceeds 1.2 s, reset Direction1, Direction2, and Time3, and return to collecting of the gesture image. If Time3 fails to exceed 1.2 s, reset Direction2, and update Time3, and return to collecting of the gesture image.

Conversely, if the gestures associated with Direction2 are the same as the gestures associated with Direction1, reset Direction2, and return to collecting of the gesture image.

Implementations of the disclosure provide a device for gesture control. The device for gesture control may be a terminal. Specifically, the device for gesture control is configured to perform the operations of the method for gesture control which is performed by the terminal. The device for gesture control of implementations of the disclosure may include modules/units corresponding to the operations of the method for gesture control.

According to implementations of the disclosure, the device for gesture control may be divided into functional modules/units in accordance with the foregoing method examples. For example, functional modules/units may be divided according to corresponding functions, and two or more functions may be integrated into one processing module/unit. The above-mentioned integrated module/unit can be implemented in the form of hardware or software functional units. The division of modules/units in implementations of the disclosure is schematic and is merely a logical function division; there may be other division manners in actual implementations.

Figure 4:
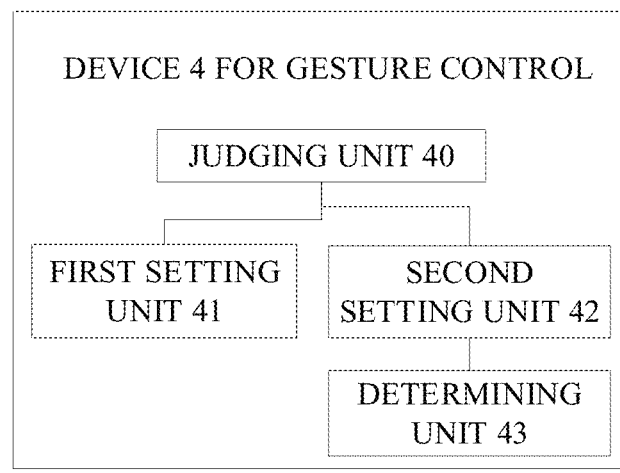
FIG. 4 is a block diagram illustrating functional units of a device for gesture control provided in implementations of the disclosure.

For example, functional units are divided according to corresponding functions. FIG. 4 is an exemplary schematic structural diagram illustrating a device for gesture control provided in foregoing implementations. As illustrated in FIG. 4, a device 4 for gesture control includes a judging unit 40, a first setting unit 41, a second setting unit 42, and a determining unit 43. The judging unit 40 is configured to determine whether a first indication field is in an initialization state, where the first indication field is associated with a user's control action. The first setting unit 41 is configured to set the first indication field according to a control action collected if the first indication field is in the initialization state, and return to determining whether the first indication field is in the initialization state. The second setting unit 42 is configured to set a second indication field according to a gesture action B1 collected if the first indication field is not in the initialization state, where the second indication field is associated with a user's gesture action B1, the gesture action B1 is represented by at least two gesture detection results, the action timing of the control action is prior to the action timing of the gesture action B1, the gesture action B1 is an air gesture, the air gesture refers to a non-contact (or contactless) gesture control operation, and the gesture detection result refers to a user's gesture determined according to a gesture image. The determining unit 43 is configured to determine a target operation instruction according to the first indication field and the second indication field, execute the target operation instruction, reset the second indication field, and return to determining whether the first indication field is in the initialization state, upon detecting that the gesture action B1 and the control action meet a preset association relationship.

In one possible example, the control action includes at least one of a voice action or a gesture action.

In one possible example, the control action is a gesture action, and the first indication field is associated with a user's gesture action A1.

In one possible example, after setting the first indication field according to the control action collected and before returning to determining whether the first indication field is in the initialization state, the first setting unit 41 is further configured to: adjust a sampling mode from a first frame-rate mode to a second frame-rate mode, where a frame rate in the first frame-rate mode is lower than a frame rate in the second frame-rate mode; and/or adjust a resolution mode from a first resolution mode to a second resolution mode, where a resolution in the first resolution mode is lower than a resolution in the second resolution mode.

In one possible example, the gesture action B1 is represented by at least two gesture detection results, the gesture detection result represents a user's gesture determined according to a gesture image, and the second setting unit 42 configured to set the second indication field according to the gesture action B1 collected is specifically configured to: determine whether no gesture, an invalid gesture, or a valid gesture exists in a gesture image currently collected, where the gesture image currently collected is a gesture image most-recently-collected; add a gesture detection result of the gesture image currently collected to a gesture action queue B2 and determine whether the number of gesture detection results in the gesture action queue B2 reaches N, if a valid gesture exists in the gesture image currently collected, where N is a positive integer; and set the second indication field according to N gesture detection results in the gesture action queue B2 and reset the gesture action queue B2, if the number of gesture detection results in the gesture action queue B2 reaches N.

In one possible example, the device 4 for gesture control further includes a third setting unit. The third setting unit is configured to reset the second indication field and return to determining whether the first indication field is in the initialization state, upon detecting that the gesture action B1 and the gesture action A1 fail to meet the preset association relationship.

In one possible example, the third setting unit is specifically configured to: reset the second indication field and return to determining whether the first indication field is in the initialization state, upon detecting that the gesture action B1 and the gesture action A1 fail to meet the preset association relationship and the N gesture detection results represent different gestures; reset the second indication field and return to determining whether the first indication field is in the initialization state, upon detecting that the gesture action B1 and the gesture action A1 fail to meet the preset association relationship and gestures represented by the N gesture detection results are the same as a gesture of the gesture action A1; and determine whether a detection duration B3 is longer than a preset duration B4, upon detecting that the gesture action B1 and the gesture action A1 fail to meet the preset association relationship, the N gesture detection results represent a same gesture, and the gesture represented by the N gesture detection results is different from the gesture of the gesture action A1, where the detection duration B3 is a duration of a gesture indicated by the second indication field. The third setting unit is specifically configured to: reset the first indication field, the second indication field, and the detection duration B3, and return to determining whether the first indication field is in the initialization state, if the detection duration B3 is longer than the preset duration B4; and reset the second indication field and the detection duration B3, and return to determining whether the first indication field is in the initialization state, if the detection duration B3 is shorter than or equal to the preset duration B4.

In one possible example, the device 4 for gesture control further includes a fourth setting unit. The fourth setting unit is configured to return to determining whether the first indication field is in the initialization state, if the number of gesture detection results in the gesture action queue B2 fails to reach N.

In one possible example, the device 4 for gesture control further includes a fifth setting unit. The fifth setting unit is configured to: determine whether a detection duration C1 is longer than a preset duration C2 if no gesture or an invalid gesture exists in the gesture image currently collected, where the detection duration C1 is a duration in which no gesture or an invalid gesture is consecutively detected when the first indication field is not in the initialization state; reset the second indication field and the detection duration C1, adjust a sampling mode to the first frame-rate mode, and return to determining whether the first indication field is in the initialization state, if the detection duration C1 is longer than the preset duration C2; and update the detection duration C1 and return to determining whether the first indication field is in the initialization state, if the detection duration C1 is shorter than or equal to the preset duration C2.

In one possible example, the first setting unit 41 configured to set the first indication field according to the control action collected is specifically configured to: determine whether no gesture, an invalid gesture, or a valid gesture exists in a gesture image currently collected, where the gesture image currently collected is a gesture image most-recently-collected; add a gesture detection result of the gesture image currently collected to a gesture action queue A2 and determine existence of M consecutive and identical gesture detection results in the gesture action queue A2, if a valid gesture exists in the gesture image currently collected, where M is a positive integer; and set the first indication field according to the M consecutive and identical gesture detection results and reset the gesture action queue A2, if the M consecutive and identical gesture detection results exist in the gesture action queue A2.

In one possible example, the device 4 for gesture control further includes a sixth setting unit. The sixth setting unit is configured to: return to determining whether the first indication field is in the initialization state, if no M consecutive and identical gesture detection results exists in the gesture action queue A2; obtain a detection duration A3 and determine whether the detection duration A3 is longer than a preset duration A4, if no gesture or an invalid gesture exists in the gesture image currently collected, where the detection duration A3 is a duration in which no gesture or an invalid gesture is consecutively detected when the first indication field is in the initialization state; reset the detection duration A3 and determine whether a current sampling mode is the second frame-rate mode, if the detection duration A3 is longer than the preset duration A4; set the sampling mode to the first frame-rate mode if the current sampling mode is the second frame-rate mode, and return to determining whether the first indication field is in the initialization state if the current sampling mode is not the second frame-rate mode; and update the detection duration A3 and return to determining whether the first indication field is in the initialization state, if the detection duration A3 is shorter than or equal to the preset duration A4.

In one possible example, the first indication field is represented by at least one of a gesture identification or an instruction ID; and the second indication field is represented by at least one of a gesture identification or an instruction ID.

In one possible example, the first indication field is represented by a first gesture identification, the second indication field is represented by a second gesture identification, and the determining unit 43 configured to determine the target operation instruction according to the first indication field and the second indication field is specifically configured to: query a preset operation-instruction set according to a target gesture information combination of the first gesture identification and the second gesture identification to obtain the target operation instruction corresponding to the target gesture information combination, where the operation-instruction set includes a correspondence between gesture information combinations and operation instructions. Alternatively, the first indication field is represented by a first instruction ID, the second indication field is represented by a second instruction ID, and the determining unit 43 configured to determine the target operation instruction according to the first indication field and the second indication field is specifically configured to: determine the target operation instruction according to the first instruction ID and the second instruction ID.

In one possible example, the first indication field is represented by a first gesture identification, and the determining unit 43 is further configured to display prompt information of the first gesture identification after setting the first indication field according to the gesture image collected.

In one possible example, the first indication field is represented by a first instruction ID, and the determining unit 43 is further configured to display prompt information of the first instruction ID and/or display information of a gesture detection result corresponding to the gesture image collected, after setting the first indication field according to the gesture image collected.

All relevant contents of each operation of the foregoing method implementations can be invoked as functional description of a corresponding functional unit, which will not be repeated herein.

Figure 5:
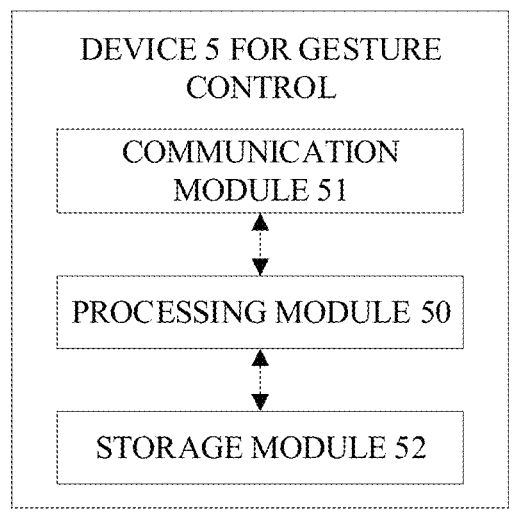
FIG. 5 is a block diagram illustrating functional units of a device for gesture control provided in other implementations of the disclosure.

For example, an integrated module is adopted. FIG. 5 is a schematic structural diagram illustrating a device for gesture control provided in implementations of the disclosure. In FIG. 5, a device 5 for gesture control includes a processing module 50 and a communication module 51. The processing module 50 is configured to control and manage actions of the device for gesture control, for example, the operations performed by the judging unit 40, the first setting unit 41, the second setting unit 42, and the determining unit 43, and/or other procedures for performing techniques described herein. The communication module 51 is configured to support interaction between the device for gesture control and other devices. As illustrated in FIG. 5, the device 5 for gesture control further includes a storage module 52. The storage module 52 is configured to store program codes and data of the device for gesture control.

The processing module 50 may be a processor or a controller, such as a CPU, a general-purpose processor, a DSP, an application-specific integrated circuit (ASIC), a field-programmable gate array (FPGA) or other programmable logic devices, a transistor logic device, a hardware component, or any combination thereof. The processing module 50 may implement or execute various exemplary logic blocks, modules, and circuits described in conjunction with contents of the disclosure. The processor may also be a combination that implements computing functions, such as a combination of one or more microprocessors, a combination of a DSP and a microprocessor, etc. The communication module 51 may be a transceiver, a radio frequency (RF) circuit, a communication interface, or the like. The storage module may be a memory.

All relevant contents of each scenario related to the foregoing method implementations can be invoked as functional description of a corresponding functional module, which will not be repeated herein. The device for gesture control is configured to perform the operations of the method for gesture control illustrated in FIG. 2A which is performed by the terminal.

Figure 6:
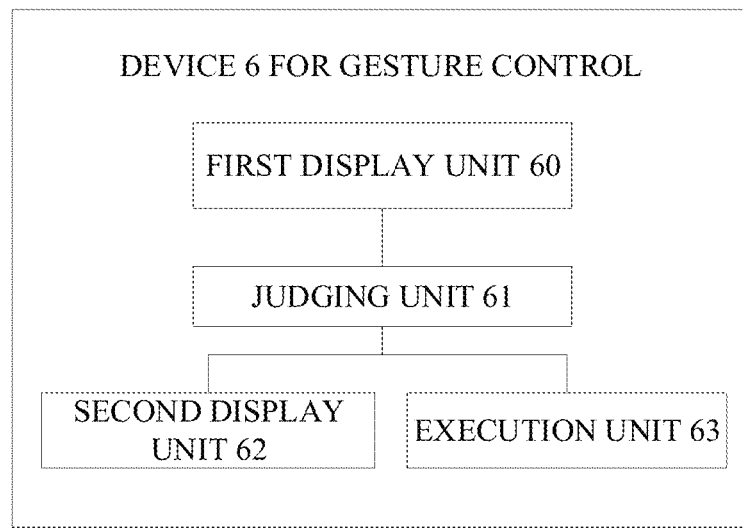
FIG. 6 is a block diagram illustrating functional units of a device for gesture control provided in implementations of the disclosure.

For example, functional units are divided according to corresponding functions. FIG. 6 is another exemplary schematic structural diagram illustrating a device for gesture control provided in foregoing implementations. As illustrated in FIG. 6, a device 6 for gesture control includes a first display unit 60, a judging unit 61, a second display unit 62, and an execution unit 63. The first display unit 60 is configured to display contents of a first page on a current interface of a screen of a local device. The judging unit 61 is configured to determine whether a user's gesture action A1 is detected, where the gesture action A1 is a hand action of the same gesture whose duration is longer than a preset duration. The second display unit 62 is configured to detect the gesture action A1, display gesture information and/or instruction information associated with the gesture action A1, and return to determining whether the user's gesture action A1 is detected, if no gesture action A1 is detected, where the gesture information is visualization information of hand movement of the gesture action A1, and the instruction information is visualization information of a reference operation instruction associated with the gesture action A1. The execution unit 63 is configured to detect a user's gesture action B1, execute a preset operation on the contents of the first page according to the gesture action A1 and the gesture action B1, reset the gesture action B1, and return to determining whether the user's gesture action A1 is detected, if the gesture action A1 is detected, where the gesture action B1 is represented by at least two gesture detection results, the gesture action A1 and the gesture action B1 each are an air gesture, the air gesture refers to a non-contact (or contactless) gesture control operation, and the gesture detection result refers to a user's gesture determined according to a detected gesture image.

In one possible example, the preset operation includes at least one of swipe up, swipe down, screenshot, return to a desktop, return to a previous menu, jump to a next menu, pause, or play.

In one possible example, if the preset operation is swipe down, return to a desktop, return to a previous menu, or pause, a gesture corresponding to the gesture action A1 is a palm, and a gesture corresponding to the gesture action B1 is that the palm is flipped to the back of the hand, where a downward direction of flipping is consistent with a downward direction of the screen of the local device; or if the preset operation is swipe up, jump to a next menu, or play, the gesture corresponding to the gesture action A1 is the back of the hand, and the gesture corresponding to the gesture action B1 is that the back of the hand is flipped to the palm, where an upward direction of flipping is consistent with an upward direction of the screen of the local device; or if the preset operation is screenshot, the gesture corresponding to the gesture action A1 is the palm, and the gesture corresponding to the gesture action B1 is that the palm is turned to a clenched fist.

In one possible example, the swipe down is to move the contents of the first page downward by a preset number of pixels, to adjust contents displayed on the current interface to contents of a second page from the contents of the first page; and the swipe up is to move the contents of the first page upward by a preset number of pixels, to adjust the contents displayed on the current interface to contents of a third page from the contents of the first page.

In one possible example, the second display unit 62 configured to detect the gesture action A1 is specifically configured to: set a first indication field according to a gesture image collected, and adjust a sampling mode from a first frame-rate mode to a second frame-rate mode, where a frame rate in the first frame-rate mode is lower than a frame rate in the second frame-rate mode, and the first indication field is associated with the gesture action A1. The execution unit 63 configured to detect the user's gesture action B1 is specifically configured to: set a second indication field according to a gesture action B1 collected, where the second indication field is associated with the user's gesture action B1. The execution unit 63 configured to execute the preset operation on the contents of the first page according to the gesture action A1 and the gesture action B1 is specifically configured to: determine a target operation instruction according to the first indication field and the second indication field and execute a preset operation corresponding to the target operation instruction on the contents of the first page, upon detecting that the gesture action B1 and the gesture action A1 meet a preset association relationship.

In one possible example, the gesture action B1 is represented by at least two gesture detection results, the gesture detection result represents a user's gesture determined according to a gesture image, and the execution unit 63 configured to set the second indication field according to the gesture action B1 collected is specifically configured to: determine whether no gesture, an invalid gesture, or a valid gesture exists in a gesture image currently collected, where the gesture image currently collected is a gesture image most-recently-collected; add a gesture detection result of the gesture image currently collected to a gesture action queue B2 and determine whether the number of gesture detection results in the gesture action queue B2 reaches N, if a valid gesture exists in the gesture image currently collected, where N is a positive integer; and set the second indication field according to N gesture detection results in the gesture action queue B2 and reset the gesture action queue B2, if the number of gesture detection results in the gesture action queue B2 reaches N.

In one possible example, the device 6 for gesture control further includes a first setting unit. The first setting unit is configured to: reset the second indication field and return to determining whether the first indication field is in the initialization state, upon detecting that the gesture action B1 and the gesture action A1 fail to meet the preset association relationship.

In one possible example, the first setting unit is specifically configured to: reset the second indication field and return to determining whether the first indication field is in the initialization state, upon detecting that the gesture action B1 and the gesture action A1 fail to meet the preset association relationship and the N gesture detection results represent different gestures; reset the second indication field and return to determining whether the first indication field is in the initialization state, upon detecting that the gesture action B1 and the gesture action A1 fail to meet the preset association relationship and gestures represented by the N gesture detection results are the same as a gesture of the gesture action A1; and determine whether a detection duration B3 is longer than a preset duration B4, upon detecting that the gesture action B1 and the gesture action A1 fail to meet the preset association relationship, the N gesture detection results represent a same gesture, and the gesture represented by the N gesture detection results is different from the gesture of the gesture action A1, where the detection duration B3 is a duration of a gesture indicated by the second indication field. The first setting unit is specifically configured to: reset the first indication field, the second indication field, and the detection duration B3, and return to determining whether the first indication field is in the initialization state, if the detection duration B3 is longer than the preset duration B4; and reset the second indication field and the detection duration B3, and return to determining whether the first indication field is in the initialization state, if the detection duration B3 is shorter than or equal to the preset duration B4.

In one possible example, the device 6 for gesture control further includes a second setting unit. The second setting unit is configured to return to determining whether the first indication field is in the initialization state, if the number of gesture detection results in the gesture action queue B2 fails to reach N.

In one possible example, the device 6 for gesture control further includes a third setting unit. The third setting unit is configured to: determine whether a detection duration C1 is longer than a preset duration C2 if no gesture or an invalid gesture exists in the gesture image currently collected, where the detection duration C1 is a duration in which no gesture or an invalid gesture is consecutively detected when the first indication field is not in the initialization state; reset the second indication field and the detection duration C1, adjust a sampling mode to the first frame-rate mode, and return to determining whether the first indication field is in the initialization state, if the detection duration C1 is longer than the preset duration C2; and update the detection duration C1 and return to determining whether the first indication field is in the initialization state, if the detection duration C1 is shorter than or equal to the preset duration C2.

In one possible example, the second display unit 62 configured to set the first indication field according to the control action collected is specifically configured to: determine whether no gesture, an invalid gesture, or a valid gesture exists in a gesture image currently collected, wherein the gesture image currently collected is a gesture image most-recently-collected; add a gesture detection result of the gesture image currently collected to a gesture action queue A2 and determine existence of M consecutive and identical gesture detection results in the gesture action queue A2, if a valid gesture exists in the gesture image currently collected, where M is a positive integer; and set the first indication field according to the M consecutive and identical gesture detection results and reset the gesture action queue A2, if the M consecutive and identical gesture detection results exist in the gesture action queue A2.

In one possible example, the device 6 for gesture control further includes a fourth setting unit. The fourth setting unit is configured to: return to determining whether the first indication field is in the initialization state, if no M consecutive and identical gesture detection results exists in the gesture action queue A2; obtain a detection duration A3 and determine whether the detection duration A3 is longer than a preset duration A4, if no gesture or an invalid gesture exists in the gesture image currently collected, where the detection duration A3 is a duration in which no gesture or an invalid gesture is consecutively detected when the first indication field is in the initialization state; reset the detection duration A3 and determine whether a current sampling mode is the second frame-rate mode, if the detection duration A3 is longer than the preset duration A4; set the sampling mode to the first frame-rate mode if the current sampling mode is the second frame-rate mode; and return to determining whether the first indication field is in the initialization state if the current sampling mode is not the second frame-rate mode; and update the detection duration A3 and return to determining whether the first indication field is in the initialization state, if the detection duration A3 is shorter than or equal to the preset duration A4.

In one possible example, the first indication field is represented by at least one of a gesture identification or an instruction ID; and the second indication field is represented by at least one of a gesture identification or an instruction ID.

In one possible example, the first indication field is represented by a first gesture identification, the second indication field is represented by a second gesture identification, and the execution unit 63 configured to determine the target operation instruction according to the first indication field and the second indication field is specifically configured to: query a preset operation-instruction set according to a target gesture information combination of the first gesture identification and the second gesture identification to obtain the target operation instruction corresponding to the target gesture information combination, where the operation-instruction set includes a correspondence between gesture information combinations and operation instructions. Alternatively, the first indication field is represented by a first instruction ID, the second indication field is represented by a second instruction ID, and the execution unit 63 configured to determine the target operation instruction according to the first indication field and the second indication field is specifically configured to: determine the target operation instruction according to the first instruction ID and the second instruction ID.

In one possible example, the first indication field is represented by a first gesture identification, the second display unit 62 configured to display gesture information and/or instruction information associated with the gesture action A1 is specifically configured to: display prompt information of the first gesture identification.

In one possible example, the first indication field is represented by a first instruction ID, the second display unit 62 configured to display gesture information and/or instruction information associated with the gesture action A1 is specifically configured to: display prompt information of the first instruction ID, and/or display information of a gesture detection result corresponding to the gesture image collected.

All relevant contents of each operation of the foregoing method implementations can be invoked as functional description of a corresponding functional module, which will not be repeated herein.

Figure 7:
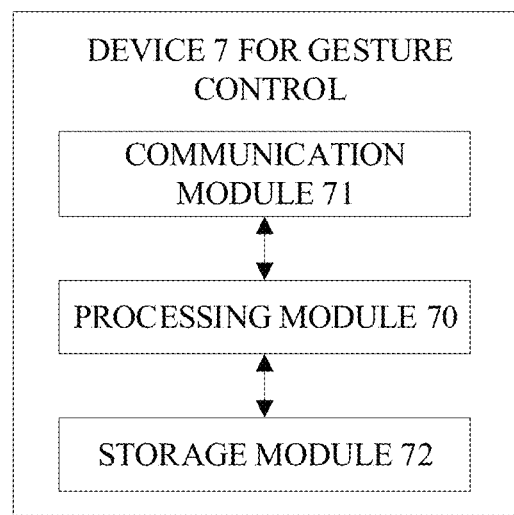
FIG. 7 is a block diagram illustrating functional units of a device for gesture control provided in other implementations of the disclosure.

For example, an integrated module is adopted. FIG. 7 is a schematic structural diagram illustrating a device for gesture control provided in implementations of the disclosure. In FIG. 7, a device 7 for gesture control includes a processing module 70 and a communication module 71. The processing module 70 is configured to control and manage actions of the device for gesture control, for example, the operations performed by the first display unit 60, the judging unit 61, the second display unit 62, and the execution unit 63, and/or other procedures for performing techniques described herein. The communication module 71 is configured to support interaction between the device for gesture control and other devices. As illustrated in FIG. 7, the device 7 for gesture control further includes a storage module 72. The storage module 72 is configured to store program codes and data of the device for gesture control.

The processing module 70 may be a processor or a controller, such as a CPU, a general-purpose processor, a DSP, an ASIC, an FPGA or other programmable logic device, a transistor logic device, a hardware component, or any combination thereof. The processing module 70 may implement or execute various exemplary logic blocks, modules, and circuits described in conjunction with contents of the disclosure. The processor may also be a combination that implements computing functions, such as a combination of one or more microprocessors, a combination of a DSP and a microprocessor, etc. The communication module 71 may be a transceiver, an RF circuit, and a communication interface, or the like. The storage module 72 may be a memory.

All relevant contents of each scenario related to the foregoing method implementations can be invoked as functional description of a corresponding functional module, which will not be repeated herein. The device for gesture control is configured to perform the operations of the method for gesture control illustrated in FIG. 3A which is performed by the terminal.

Implementations of the disclosure further provide a chip. The chip includes a processor and a memory. The processor is configured to invoke computer programs from the memory and run the computer programs to cause a device having the chip to execute all or part of the operations as described in the foregoing method implementations which is performed by a terminal.

Implementations of the disclosure further provide a computer-readable storage medium. The computer-readable storage medium stores computer programs for electronic data interchange. The computer programs causes a computer to execute all or part of the operations as described in the foregoing method implementations which is performed by a terminal.

Implementations of the disclosure further provide a computer-readable storage medium. The computer-readable storage medium stores computer programs for electronic data interchange. The computer programs causes a computer to execute all or part of the operations as described in the foregoing method implementations which is performed by a network-side device.

Implementations of the disclosure further provide a computer program product. The computer program product includes computer programs. The computer programs are operable with a computer to execute all or part of the operations as described in the foregoing method implementations which is performed by a terminal. The computer program product may be a software installation package.

The operations of the method or algorithm described in implementations of the disclosure may be implemented in hardware, or may be implemented in a manner in which a processor executes software instructions. The software instructions may be composed of corresponding software modules. The software modules may be stored in an RAM, a flash memory, an ROM, an erasable programmable ROM (EPROM), an electrically EPROM (EEPROM), a register, a hard disk, a removable hard disk, a compact disc ROM (CD-ROM), or any other form of storage medium known in the art. An exemplary storage medium is coupled with the processor, so that the processor can read information from, and write information to, the storage medium. The storage medium may also be a part of the processor. The processor and the storage medium may be in an ASIC. Additionally, the ASIC may be in access network equipment, target network equipment, or core network equipment. The processor and the storage medium may also exist in the access network equipment, the target network equipment, or the core network equipment as discrete components.

Those skilled in the art should realize that, in one or more of the foregoing examples, the functions described in implementations of the disclosure may be implemented in whole or in part by software, hardware, firmware, or any combination thereof. When implemented in software, the functions can be implemented in whole or in part in the form of a computer program product. The computer program product includes one or more computer instructions. The computer instructions, when loaded and executed on a computer, are operable to implement all or part of the processes or functions described in implementations of the disclosure. The computer may be a general-purpose computer, a special-purpose computer, a computer network, or other programmable devices. The computer instructions may be stored in a computer readable storage medium, or transmitted from a computer-readable storage medium to another computer-readable storage medium. For example, the computer instructions is transmitted from a website site, a computer, a server, or a data center to another website site, another computer, another server, or another data center in a wired manner (e.g., coaxial cable, optical fiber, digital subscriber line (DSL)) or a wireless manner (e.g., infrared, wireless, microwave). The computer-readable storage medium may be any available medium that can be accessed by a computer or a data storage device (e.g., a server, a data center) integrated with one or more available media. The available medium may be a magnetic medium (e.g., a floppy disk, a hard disk, a magnetic tape), an optical medium (e.g., digital video disc (DVD)), or a semiconductor medium (e.g., a solid state disk (SSD)), etc.

While purposes, technical solutions, and beneficial effects of implementations of the disclosure have been illustrated in detail above with reference to the implementations of the disclosure, it will be understood by those skilled in the art that the foregoing implementations are merely illustrative examples, and the protection scope of the disclosure is not limited thereto. Any modifications, equivalent substitutions, or improvements made thereto on the basis of technical solutions of the implementations of the disclosure shall all be encompassed within the protection scope of the disclosure.

What is claimed is:

1. A method for gesture control, comprising:
setting a sampling mode corresponding to a gesture control function of an electronic device to a first frame-rate mode or setting a display resolution of the electronic device to a first resolution mode, and setting a first indication field for a captured gesture image to an initialization state;

determining whether the first indication field of the gesture image is in the initialization state;

setting the first indication field according to a control action in a currently collected gesture image, on condition that the first indication field is in the initialization state, wherein the control action is a gesture action A1 of a user, the gesture action A1 is represented by at least one gesture detection result that represents a gesture of the user determined according to the gesture image, and an action timing of the control action is prior to an action time of a gesture action B1;

setting a second indication field according to the gesture action B1 in the currently collected gesture image, on condition that the first indication field is not in the initialization state, wherein the gesture action B1 is represented by at least two gesture detection results according to the gesture image; and determining a target operation instruction according to the first indication field and the second indication field, executing the target operation instruction, resetting the second indication field, and returning to determining whether the first indication field is in the initialization state, when the gesture action B1 and the control action meet an association relationship.

2. The method of claim 1, wherein the gesture action B1 and the control action meet the association relationship when the second indication field and the first indication field meet the association relationship.

3. The method of claim 1, wherein after setting the first indication field according to the control action collected and before returning to determining whether the first indication field is in the initialization state, the method further comprises at least one of:

adjusting the sampling mode from the first frame-rate mode to a second frame-rate mode, wherein a frame rate in the first frame-rate mode is lower than a frame rate in the second frame-rate mode; or adjusting the resolution mode from the first resolution mode to a second resolution mode, wherein a resolution in the first resolution mode is lower than a resolution in the second resolution mode.

4. The method of claim 3, wherein setting the second indication field according to the gesture action B1 collected comprises:

determining whether no gesture, an invalid gesture, or a valid gesture exists in a gesture image currently collected, wherein the gesture image currently collected is a gesture image most-recently-collected;

adding a gesture detection result of the gesture image currently collected to a gesture action queue B2 and determining whether a number of gesture detection results in the gesture action queue B2 reaches N, on condition that a valid gesture exists in the gesture image currently collected, wherein N is a positive integer greater than 1; and setting the second indication field according to N gesture detection results in the gesture action queue B2 and resetting the gesture action queue B2, on condition that the number of gesture detection results in the gesture action queue B2 reaches N.

5. The method of claim 4, wherein the method further comprises:

resetting the second indication field and returning to determining whether the first indication field is in the initialization state, when the gesture action B1 and the gesture action A1 fail to meet the association relationship.

6. The method of claim 5, wherein resetting the second indication field and returning to determining whether the first indication field is in the initialization state when the gesture action B1 and the gesture action A1 fail to meet the association relationship comprise one of:

resetting the second indication field and returning to determining whether the first indication field is in the initialization state, when the gesture action B1 and the gesture action A1 fail to meet the association relationship and the N gesture detection results represent different gestures; or resetting the second indication field and returning to determining whether the first indication field is in the initialization state, when the gesture action B1 and the gesture action A1 fail to meet the association relationship and gestures represented by the N gesture detection results are the same as a gesture of the gesture action A1; or determining whether a detection duration B3 is longer than a duration B4, when the gesture action B1 and the gesture action A1 fail to meet the association relationship, the N gesture detection results represent a same gesture, and the gesture represented by the N gesture detection results is different from the gesture of the gesture action A1, wherein the detection duration B3 is a duration of a gesture indicated by the second indication field;

resetting the first indication field, the second indication field, and the detection duration B3, and returning to determining whether the first indication field is in the initialization state, on condition that the detection duration B3 is longer than the duration B4; or resetting the second indication field, updating the detection duration B3, and returning to determining whether the first indication field is in the initialization state, on condition that the detection duration B3 is shorter than or equal to the duration B4.

7. The method of claim 4, further comprising:

returning to determining whether the first indication field is in the initialization state, on condition that the number of gesture detection results in the gesture action queue B2 fails to reach N.

8. The method of claim 4, further comprising:

determining whether a detection duration C1 is longer than a duration C2 on condition that no gesture or an invalid gesture exists in the gesture image currently collected, wherein the detection duration C1 is a duration in which no gesture or an invalid gesture is consecutively detected when the first indication field is not in the initialization state;

resetting the second indication field and the detection duration C1, adjusting the sampling mode to the first frame-rate mode, and returning to determining whether the first indication field is in the initialization state, on condition that the detection duration C1 is longer than the duration C2; and updating the detection duration C1 and returning to determining whether the first indication field is in the initialization state, on condition that the detection duration C1 is shorter than or equal to the duration C2.

9. The method of claim 1, wherein setting the first indication field according to the control action collected comprises:
    determining whether no gesture, an invalid gesture, or a valid gesture exists in a gesture image currently collected, wherein the gesture image currently collected is a gesture image most-recently-collected;
    adding a gesture detection result of the gesture image currently collected to a gesture action queue A2 and determining existence of M consecutive and identical gesture detection results in the gesture action queue A2, on condition that a valid gesture exists in the gesture image currently collected, wherein M is a positive integer; and
    setting the first indication field according to the M consecutive and identical gesture detection results and resetting the gesture action queue A2, on condition that the M consecutive and identical gesture detection results exist in the gesture action queue A2.

10. The method of claim 9, further comprising:
    returning to determining whether the first indication field is in the initialization state, on condition that no M consecutive and identical gesture detection results exists in the gesture action queue A2;
    obtaining a detection duration A3 and determining whether the detection duration A3 is longer than a duration A4, on condition that no gesture or an invalid gesture exists in the gesture image currently collected, wherein the detection duration A3 is a duration in which no gesture or an invalid gesture is consecutively detected when the first indication field is in the initialization state; and
    one of:
        resetting the detection duration A3 and determining whether a sampling mode is a second frame-rate mode on condition that the detection duration A3 is longer than the duration A4, and setting the sampling mode to a first frame-rate mode and returning to determining whether the first indication field is in the initialization state on condition that the sampling mode is the second frame-rate mode, or returning to determining whether the first indication field is in the initialization state on condition that the sampling mode is not the second frame-rate mode; or
        updating the detection duration A3 and returning to determining whether the first indication field is in the initialization state, on condition that the detection duration A3 is shorter than or equal to the duration A4.

11. The method of claim 1, wherein the first indication field is represented by a first gesture identification, the second indication field is represented by a second gesture identification, and determining the target operation instruction according to the first indication field and the second indication field comprises:
    querying a preset operation-instruction set according to a target gesture information combination of the first gesture identification and the second gesture identification to obtain the target operation instruction corresponding to the target gesture information combination, wherein the operation-instruction set comprises a correspondence between gesture information combinations and operation instructions.

12. The method of claim 1, wherein the first indication field is represented by a first instruction identity (ID), the second indication field is represented by a second instruction ID, and determining the target operation instruction according to the first indication field and the second indication field comprises:
    determining the target operation instruction according to the first instruction ID and the second instruction ID.

13. The method of claim 1, wherein the first indication field is represented by a first gesture identification, after setting the first indication field according to the control action collected, the method further comprises:
    displaying prompt information of the first gesture identification.

14. The method of claim 1, wherein the first indication field is represented by a first instruction identity (ID), after setting the first indication field according to the control action collected, the method further comprises:
    displaying prompt information of the first instruction ID; and/or
    displaying information of a gesture detection result of a gesture image corresponding to the control action collected.

15. A terminal, comprising:
    a processor; and
    a memory, coupled with the processor and storing one or more programs which, when executed by the processor, are operable with the processor to:
        set a sampling mode corresponding to a gesture control function of an electronic device to a first frame-rate mode or set a display resolution of the electronic device to a first resolution mode, and set a first indication field for a captured gesture image to an initialization state;
        determine whether the first indication field of the gesture image is in the initialization state;
        set the first indication field according to a control action in a currently collected gesture image, on condition that the first indication field is in the initialization state, wherein the control action is a gesture action A1 of a user, the gesture action A1 is represented by at least one gesture detection result that represents a gesture of the user determined according to the gesture image, and an action timing of the control action is prior to an action time of a gesture action B1;
        set a second indication field according to the gesture action B1 in the currently collected gesture image, on condition that the first indication field is not in the initialization state, wherein the gesture action B1 is represented by at least two gesture detection results according to the gesture image; and
        determine a target operation instruction according to the first indication field and the second indication field, execute the target operation instruction, reset the second indication field, and return to determining whether the first indication field is in the initialization state, when the gesture action B1 and the control action meet an association relationship.

* * * * *